US006564315B1

(12) United States Patent
Keller et al.

(10) Patent No.: US 6,564,315 B1
(45) Date of Patent: May 13, 2003

(54) SCHEDULER WHICH DISCOVERS NON-SPECULATIVE NATURE OF AN INSTRUCTION AFTER ISSUING AND REISSUES THE INSTRUCTION

(75) Inventors: James B. Keller, Palo Alto, CA (US); Ramsey W. Haddad, Cupertino, CA (US); Stephan G. Meier, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/476,322

(22) Filed: Jan. 3, 2000

(51) Int. Cl.[7] ............................................. G06F 9/312

(52) U.S. Cl. ..................................... 712/214; 712/235

(58) Field of Search ........................ 712/214, 23, 235

(56) References Cited

U.S. PATENT DOCUMENTS

| 4,521,851 A | 6/1985 | Trubisky et al. ............ 712/218 |
| 4,594,660 A | 6/1986 | Guenthner et al. ........... 712/23 |
| 5,404,470 A | 4/1995 | Miyake ...................... 712/217 |
| 5,465,336 A | 11/1995 | Imai et al. .................. 712/216 |
| 5,467,473 A | 11/1995 | Kahle et al. .................. 712/23 |
| 5,555,432 A | 9/1996 | Hinton et al. ................. 712/23 |
| 5,651,125 A | 7/1997 | Witt et al. ................... 712/218 |

(List continued on next page.)

FOREIGN PATENT DOCUMENTS

| WO | 96/12227 | 4/1996 |
| WO | 97/27538 | 7/1997 |
| WO | 00/11548 | 3/2000 |

OTHER PUBLICATIONS

Johnson, *Superscalar Microprocessor Design*, PrenticeHall, 1991, pp. 127–129.

Gwennap, "Digital 21264 Sets New Standard," Microdesign Resources, vol. 10, No. 14, Oct. 1996, pp. 103–108.

International Search Report, Application No. PCT/US 00/22458, mailed Jan. 19, 2001.

International Search Report Application No. PCT/US 00/22458, mailed Jan. 19, 2001.

*Primary Examiner*—Eric Coleman
(74) *Attorney, Agent, or Firm*—Lawrence J. Metkel; Meyertons, Hood, Kivlin, Kowert & Goetzel, P.C.

(57) ABSTRACT

A scheduler issues instruction operations for execution, but also retains the instruction operations. If a particular instruction operation is subsequently found to be required to execute non-speculatively, the particular instruction operation is still stored in the scheduler. Subsequent to determining that the particular operation has become non-speculative (through the issuance and execution of instruction operations prior to the particular instruction operation), the particular instruction operation may be reissued from the scheduler. The penalty for incorrect scheduling of instruction operations which are to execute non-speculatively may be reduced as compared to purging the particular instruction operation and younger instruction operations from the pipeline and refetching the particular instruction operation. Additionally, the scheduler may maintain the dependency indications for each instruction operation which has been issued. If the particular instruction operation is reissued, the instruction operations which are dependent on the particular instruction operation (directly or indirectly) may be identified via the dependency indications. The scheduler reissues the dependent instruction operations as well. Instruction operations which are subsequent to the particular instruction operation in program order but which are not dependent on the particular instruction operation are not reissued. Accordingly, the penalty for incorrect scheduling of instruction operations which are to be executed non-speculatively may be further decreased over the purging of the particular instruction and all younger instruction operations and refetching the particular instruction operation.

24 Claims, 14 Drawing Sheets

U.S. PATENT DOCUMENTS

| | | | |
|---|---|---|---|
| 5,655,096 A | 8/1997 | Branigin | 712/200 |
| 5,710,902 A | 1/1998 | Sheaffer et al. | 712/216 |
| 5,717,883 A | 2/1998 | Sager | 712/218 |
| 5,748,978 A | 5/1998 | Narayan et al. | 712/23 |
| 5,751,985 A | 5/1998 | Shen et al. | 712/218 |
| 5,778,219 A * | 7/1998 | Amerson et al. | 712/244 |
| 5,794,029 A * | 8/1998 | Babaian et al. | 712/241 |
| 5,799,165 A | 8/1998 | Favor et al. | 712/214 |
| 5,835,747 A | 11/1998 | Trull | 712/216 |
| 5,884,059 A | 3/1999 | Favor et al. | 712/215 |
| 5,884,060 A | 3/1999 | Vegesna et al. | 712/215 |
| 5,884,061 A | 3/1999 | Hesson et al. | 712/217 |
| 5,915,117 A * | 6/1999 | Ross et al. | 710/262 |
| 5,923,862 A | 7/1999 | Nguyen et al. | 712/208 |
| 5,941,983 A | 8/1999 | Gupta et al. | 712/214 |
| 5,978,900 A | 11/1999 | Liu et al. | 712/216 |
| 5,987,594 A | 11/1999 | Panwar et al. | 712/216 |
| 5,996,068 A | 11/1999 | Dwyer, III et al. | 712/228 |
| 6,016,540 A | 1/2000 | Zaidi et al. | 712/214 |
| 6,065,105 A | 5/2000 | Zaidi et al. | 712/23 |
| 6,076,153 A | 6/2000 | Grochowski et al. | 712/23 |
| 6,098,166 A | 8/2000 | Leibholz et al. | 712/216 |
| 6,108,769 A | 8/2000 | Chinnakonda et al. | 712/216 |
| 6,122,727 A | 9/2000 | Witt | 712/214 |
| 6,212,622 B1 | 4/2001 | Witt | 712/216 |
| 6,212,623 B1 | 4/2001 | Witt | 712/216 |
| 6,308,259 B1 | 10/2001 | Witt | 712/214 |
| 6,321,328 B1 * | 11/2001 | Karp et al. | 712/225 |
| 6,336,178 B1 * | 1/2002 | Favor | 712/209 |

* cited by examiner

SCHEDULER WHICH DISCOVERS NON-SPECULATIVE NATURE OF AN INSTRUCTION AFTER ISSUING AND REISSUES THE INSTRUCTION

BACKGROUND OF THE INVENTION

1. Field of the Invention

This invention is related to the field of processors and, more particularly, to instruction scheduling mechanisms within processors.

2. Description of the Related Art

Superscalar processors attempt to achieve high performance by issuing and executing multiple instructions per clock cycle and by employing the highest possible clock frequency consistent with the design. One method for increasing the number of instructions executed per clock cycle is out of order execution. In out of order execution, instructions may be executed in a different order than that specified in the program sequence (or "program order"). Certain instructions near each other in a program sequence may have dependencies which prohibit their concurrent execution, while subsequent instructions in the program sequence may not have dependencies on the previous instructions. Accordingly, out of order execution may increase performance of the superscalar processor by increasing the number of instructions executed concurrently (on the average). Another method related to out of order execution is speculative execution, in which instructions are executed subsequent to other instructions which may cause program execution to proceed down a different path than the path containing the speculative instructions. For example, instructions may be speculative if the instructions are subsequent to a particular instruction which may cause an exception. Instructions are also speculative if the instructions are subsequent to a predicted conditional branch instruction which has not yet been executed. Similarly, instructions may be out of order or speculatively scheduled, issued, etc.

Unfortunately, scheduling instructions for out of order or speculative execution presents additional hardware complexities for the processor. The term "scheduling" generally refers to selecting an instruction for execution. Typically, the processor attempts to schedule instructions as rapidly as possible to maximize the average instruction execution rate (e.g. by executing instructions out of order to deal with dependencies and hardware availability for various instruction types). These complexities may limit the clock frequency at which the processor may operate. In particular, the dependencies between instructions must be respected by the scheduling hardware. Generally, as used herein, the term "dependency" refers to a relationship between a first instruction and a subsequent second instruction in program order which requires the execution of the first instruction prior to the execution of the second instruction. A variety of dependencies may be defined. For example, a source operand dependency occurs if a source operand of the second instruction is a destination operand of the first instruction.

Generally, instructions may have one or more source operands and one or more destination operands. The source operands are input values to be manipulated according to the instruction definition to produce one or more results (which are the destination operands). Source and destination operands may be memory operands stored in a memory location external to the processor, or may be register operands stored in register storage locations included within the processor. The instruction set architecture employed by the processor defines a number of architected registers. These registers are defined to exist by the instruction set architecture, and instructions may be coded to use the architected registers as source and destination operands. An instruction specifies a particular register as a source or destination operand via a register number (or register address) in an operand field of the instruction. The register number uniquely identifies the selected register among the architected registers. A source operand is identified by a source register number and a destination operand is identified by a destination register number.

In addition to operand dependencies, one or more types of ordering dependencies may be enforced by a processor. Ordering dependencies may be used, for example, to simplify the hardware employed or to generate correct program execution. By forcing certain instructions to be executed in order with respect to certain other instructions, hardware for handling consequences of the out of order execution of the instructions may be omitted. For example, instructions which update special registers containing general processor operating state may affect the execution of a variety of subsequent instructions which do not explicitly access the special registers. Generally, ordering dependencies may vary from microarchitecture to microarchitecture.

While the scheduling mechanism respects dependencies, it is desirable to be as aggressive as possible in scheduling instructions out of order and/or speculatively in an attempt to maximize the performance gain realized. However, the more aggressive the scheduling mechanism (i.e. the fewer conditions which may prevent a particular instruction from being scheduled), the more likely the occurrence of an incorrectly executed instruction becomes. The recovery mechanism for incorrectly executed instructions has generally been to purge the incorrectly executed instruction and all subsequent instructions from the processor pipeline and to refetch the incorrectly executed instruction (and subsequent instructions). Often, the purging and refetching is delayed from the discovery of incorrect execution for hardware simplicity (e.g. until the incorrectly executed instruction is the oldest instruction in flight). The average number of instructions actually executed per clock cycle is decreased due to the incorrect execution and the subsequent purging events. For aggressive scheduling mechanisms which encounter incorrect execution more frequently, the performance degradation attributable to these recovery mechanisms may be substantial. Accordingly, a mechanism for recovering from incorrect speculative execution which preserves performance gains made possible by aggressive speculative or out of order scheduling is desired.

SUMMARY OF THE INVENTION

The problems outlined above are in large part solved by a scheduler as described herein. The scheduler issues instruction operations for execution, but also retains the instruction operations. If a particular instruction operation is subsequently found to be required to execute non-speculatively, the particular instruction operation is still stored in the scheduler. Subsequent to determining that the particular instruction operation has become non-speculative (through the issuance and execution of instruction operations prior to the particular instruction operation), the particular instruction operation may be reissued from the scheduler. Advantageously, the penalty for incorrect scheduling of instruction operations which are to execute non-speculatively may be reduced as compared to purging the particular instruction operation and younger instruction operations from the pipeline and refetching the particular instruction operation. Performance may be increased due to the reduced penalty for incorrect execution.

Additionally, the scheduler may maintain the dependency indications for each instruction operation which has been issued. If the particular instruction operation is reissued, the instruction operations which are dependent on the particular instruction operation (directly or indirectly) may be identified via the dependency indications. The scheduler reissues the dependent instruction operations as well. Instruction operations which are subsequent to the particular instruction operation in program order but which are not dependent on the particular instruction operation are not reissued. Accordingly, the penalty for incorrect scheduling of instruction operations which are to be executed non-speculatively may be further decreased over the purging of the particular instruction and all younger instruction operations and refetching the particular instruction operation. Performance may thus be further increased.

Broadly speaking, a scheduler is contemplated. The scheduler comprises an instruction buffer configured to store a first instruction operation, an issue pick circuit coupled to the instruction buffer, and a control circuit coupled to the issue pick circuit. The issue pick circuit is configured to select the first instruction operation for issue from the instruction buffer while the first instruction operation is speculative. Coupled to receive a first signal indicating that the first instruction operation is to execute non-speculatively, the control circuit is configured to maintain a first execution state of the first instruction operation, and is configured to change the first execution state to an executing state responsive to the issue pick circuit selecting the first instruction operation for issue. Additionally, the control circuit is configured to change the first execution state to a not executed state responsive to the first signal, and is configured to record a first indication that:the first instruction operation is to be executed non-speculatively in response to the first signal.

Additionally, a processor is contemplated comprising a scheduler and an execution unit. The scheduler is configured to store a first instruction operation and to speculatively issue the first instruction operation. The scheduler is also configured to maintain a first execution state of the first instruction operation, and is configured to change the first execution state to an executing state responsive to issuing the first instruction operation. Coupled to the scheduler to receive the first instruction operation in response to an issuance thereof, the execution unit is configured to execute the first instruction operation and to generate a first signal if the first instruction operation is to execute non-speculatively. The scheduler is configured to change the first execution state to a not executed state responsive to the first signal and is further configured to record a first indication that the first instruction operation is to be executed non-speculatively in response to the first signal. Furthermore, a computer system is contemplated including the processor and an input/output (I/O) device configured to communicate between the computer system and another computer system to which the I/O device is couplable.

Still further, a method is contemplated. A first instruction operation is speculatively issued from a scheduler to an execution unit. The first instruction operation is executed in the execution unit, the executing including determining that the first instruction operation is to be executed non-speculatively. The first instruction operation is determined to be non-speculative, and the first instruction operation is reissued responsive to determining that the first instruction operation is non-speculative.

Moreover, A processor is contemplated comprising a scheduler and an execution unit. The scheduler is configured to store a first instruction operation and to speculatively issue the first instruction operation. The scheduler is configured to retain the first instruction operation subsequent to issuing. Coupled to the scheduler to receive the first instruction operation in response to an issuance thereof, the execution unit is configured to execute the first instruction operation and to generate a first signal if the first instruction operation is to execute non-speculatively. The scheduler is coupled to receive the first signal from the execution unit and, responsive to the first signal and to the first instruction operation becoming non-speculative, the scheduler is configured to reissue the first instruction operation.

BRIEF DESCRIPTION OF THE DRAWINGS

Other objects and advantages of the invention will become apparent upon reading the following detailed description and upon reference to the accompanying drawings in which.

Figure 1:
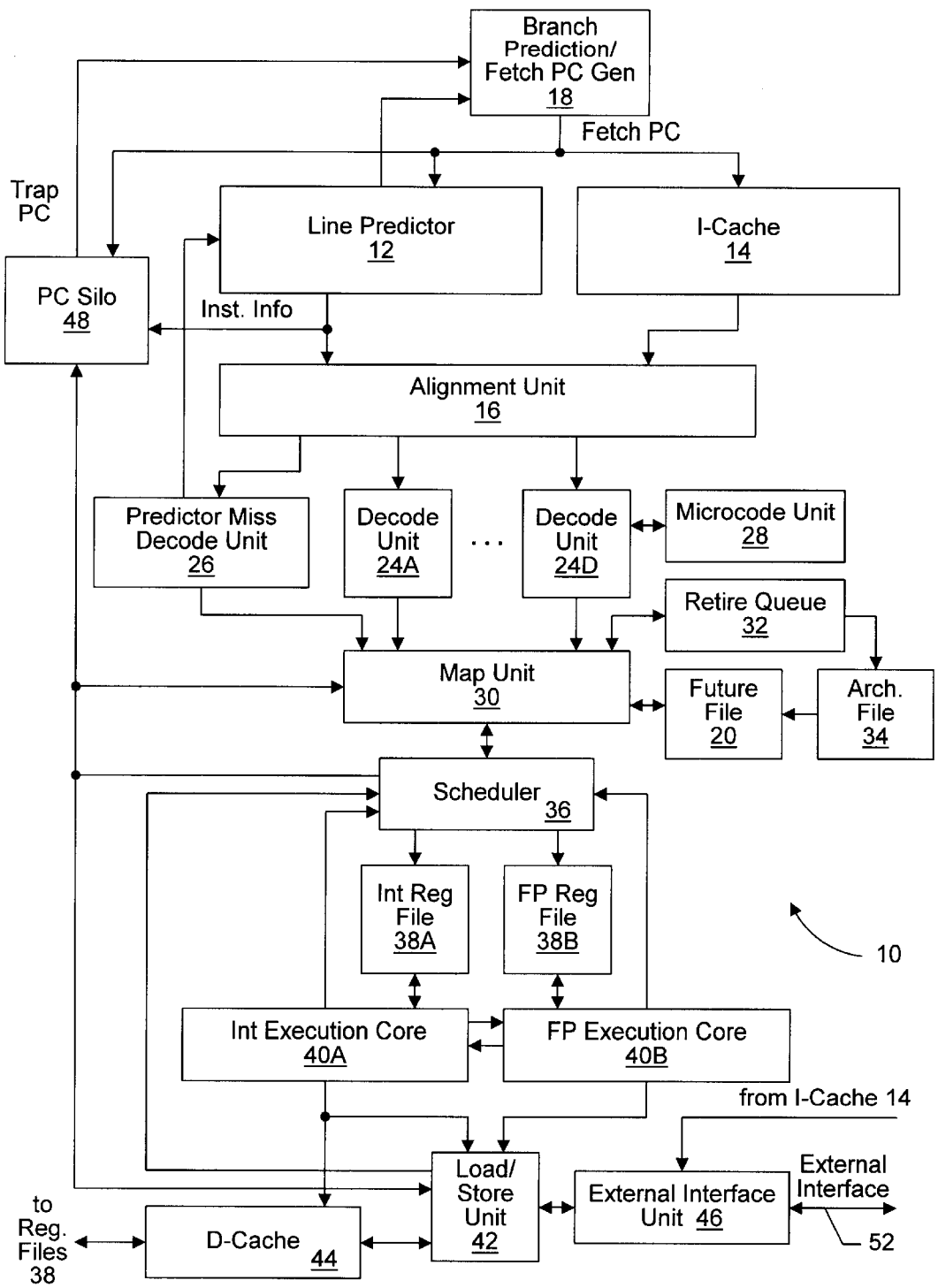
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch prediction/fetch PC generation unit 18, a plurality of decode units 24A–24D, a predictor miss decode unit 26, a microcode unit 28, a map unit 30, a retire queue 32, an architectural renames file 34, a future file 20, a scheduler 36, an integer register file 38A, a floating point register file 38B, an integer execution core 40A, a floating point execution core 40B, a load/store unit 42, a data cache (D-cache) 44, an external interface unit 46, and a PC silo 48. Line predictor 12 is coupled to predictor miss decode unit 26, branch prediction/fetch PC generation unit 18, PC silo 48, and alignment unit 16. I-cache 14 is coupled to alignment unit 16 and branch prediction/fetch PC generation unit 18, which is further coupled to PC silo 48. Alignment unit 16 is further coupled to predictor miss decode unit 26 and decode units 24A–24D. Decode units 24A–24D are further coupled to map unit 30, and decode unit 24D is, coupled to microcode unit 28. Map unit 30 is coupled to retire queue 32 (which is coupled to architectural renames file 34), future file 20, scheduler 36, and PC silo 48. Architectural renames file 34 is coupled to future file 20. Scheduler 36 is coupled to register files 38A–38B, which are further coupled to respective execution cores 40A–40B. Execution cores 40A–40B are further coupled to load/store unit 42 and scheduler 36. Execution core 40A is further coupled to D-cache 44. Load/store unit 42 is coupled to scheduler 36, D-cache 44, and external interface unit 46. D-cache 44 is coupled to register files 38. External interface unit 46 is coupled to an external interface 52 and to I-cache 14. Elements referred to herein by a reference numeral followed by a letter will be collectively referred to by the reference numeral alone. For example, decode units 24A–24D will be collectively referred to as decode units 24.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures. Additionally, any of the above embodiments may employ a 64 bit architecture, if desired.

Branch prediction/fetch PC generation unit 18 is configured to provide a fetch address (fetch PC) to I-cache 14, line predictor 12, and PC silo 48. Branch prediction/fetch PC generation unit 18 may include a suitable branch prediction mechanism used to aid in the generation of fetch addresses. In response to the fetch address, line predictor 12 provides alignment information corresponding to a plurality of instructions to alignment unit 16, and may provide a next fetch address for fetching instructions subsequent to the instructions identified by the provided instruction information. The next fetch address may be provided to branch prediction/fetch PC generation unit 18 or may be directly provided to I-cache 14, as desired. Branch prediction/fetch PC generation unit 18 may receive a trap address from PC silo 48 (if a trap is detected) and the trap address may comprise the fetch PC generated by branch prediction/fetch PC generation unit 18. Otherwise, the fetch PC may be generated using the branch prediction information and information from line predictor 12. Generally, line predictor 12 stores information corresponding to instructions previously speculatively fetched by processor 10. In one embodiment, line predictor 12 includes 2K entries, each entry locating a group of one or more instructions referred to herein as a "line" of instructions. The line of instructions may be concurrently processed by the instruction processing pipeline of processor 10 through being placed into scheduler 36.

I-cache 14 is a high speed cache memory for storing instruction bytes. According to one embodiment I-cache 14 may comprise, for example, a 128 Kbyte, four way set associative organization employing 64 byte cache lines. However, any I-cache structure may be suitable (including direct-mapped structures).

Alignment unit 16 receives the instruction alignment information from line predictor 12 and instruction bytes corresponding to the fetch address from I-cache 14. Alignment unit 16 selects instruction bytes into each of decode units 24A–24D according to the provided instruction operation information. More particularly, line predictor 12 provides an instruction pointer corresponding to each decode unit 24A–24D. The instruction pointer locates an instruction within the fetched instruction bytes for conveyance to the corresponding decode unit 24A–24D. In one embodiment, certain instructions may be conveyed to more than one decode unit 24A–24D. Accordingly, in the embodiment shown, a line of instructions from line predictor 12 may include up to 4 instructions, although other embodiments may include more or fewer decode units 24 to provide for more or fewer instructions within a line.

Decode units 24A–24D decode the instructions provided thereto, and each decode unit 24A–24D generates information identifying one or more instruction operations (or ROPs) corresponding to the instructions. In one embodiment, each decode unit 24A–24D may generate up to two instruction operations per instruction. As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines (fetched from a read-only memory therein via decode unit 24D in the present embodiment). Furthermore, other embodiments may employ a single instruction operation for each instruction (i.e. instruction and instruction operation may be synonymous in such embodiments).

PC silo 48 stores the fetch address and instruction information for each instruction fetch, and is responsible for redirecting instruction fetching upon exceptions (such as instruction traps defined by the instruction set architecture employed by processor 10, branch mispredictions, and other microarchitecturally defined traps). PC silo 48 may include a circular buffer for storing fetch address and instruction information corresponding to multiple lines of instructions which may be outstanding within processor 10. In response to retirement of a line of instructions, PC silo 48 may discard the corresponding entry. In response to an exception, PC silo 48 may provide a trap address to branch prediction/fetch PC generation unit 18. Retirement and exception information may be provided by scheduler 36. In one embodiment, map unit 30 assigns a sequence number (R#) to each instruction to identify the order of instructions outstanding within processor 10. Scheduler 36 may return R#s to PC silo 48 to identify instruction operations experiencing exceptions or retiring instruction operations.

Upon detecting a miss in line predictor 12, alignment unit 16 routes the corresponding instruction bytes from I-cache 14 to predictor miss decode unit 26. Predictor miss decode unit 26 decodes the instruction, enforcing any limits on a line of instructions as processor 10 is designed for (e.g. maximum number of instruction operations, maximum number of instructions, terminate on branch instructions, etc.). Upon terminating a line, predictor miss decode unit 26 provides the information to line predictor 12 for storage. It is noted that predictor miss decode unit 26 may be configured to dispatch instructions as they are decoded. Alternatively, predictor miss decode unit 26 may decode the line of instruction information and provide it to line predictor 12 for storage. Subsequently, the missing fetch address may be reattempted in line predictor 12 and a hit may be detected.

In addition to decoding instructions upon a miss in line predictor 12, predictor miss decode unit 26 may be configured to decode instructions if the instruction information provided by line predictor 12 is invalid. In one embodiment, processor 10 does not attempt to keep information in line predictor 12 coherent with the instructions within I-cache 14 (e.g. when instructions are replaced or invalidated in I-cache 14, the corresponding instruction information may not actively be invalidated). Decode units 24A–24D may verify the instruction information provided, and may signal predictor miss decode unit 26 when invalid instruction information is detected. According to one particular embodiment, the following instruction operations are supported by processor 10: integer (including arithmetic, logic, shift/rotate, and branch operations), floating point (including multimedia operations), and load/store.

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Map unit 30 additionally provides an indication of the dependencies for each instruction operation by providing R#s of the instruction operations which update each physical register number assigned to a source operand of the instruction operation. Map unit 30 updates future file 20 with the physical register numbers assigned to each destination register (and the R# of the corresponding instruction operation) based on the corresponding logical register number. Additionally, map unit 30 stores the logical register numbers of the destination registers, assigned physical register numbers, and the previously assigned physical register numbers in retire queue 32. As instructions are retired (indicated to map unit 30 by scheduler 36), retire queue 32 updates architectural renames file 34 and frees any registers which are no longer in use. Accordingly, the physical register numbers in architectural register file 34 identify the physical registers storing the committed architectural state of processor 10, while future file 20 represents the speculative state of processor 10. In other words, architectural renames file 34 stores a physical register number corresponding to each logical register, representing the committed register state for each logical register. Future file 20 stores a physical register number corresponding to each logical register, representing the speculative register state for each logical register.

The line of instruction operations, source physical register numbers, and destination physical register numbers are stored into scheduler 36 according to the R#s assigned by map unit 30. Furthermore, dependencies for a particular instruction operation may be noted as dependencies on other instruction operations which are stored in the scheduler. In one embodiment, instruction operations remain in scheduler 36 until retired.

Scheduler 36 stores each instruction operation until the dependencies noted for that instruction operation have been satisfied. In response to scheduling a particular instruction operation for execution, scheduler 36 may determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Scheduler 36 awaits the specified number of clock cycles (until the update will occur prior to or coincident with the dependent instruction operations reading the register file), and then indicates that instruction operations dependent upon that particular instruction operation may be scheduled. It is noted that scheduler 36 may schedule an instruction once its dependencies have been satisfied (i.e. out of order with respect to its order within the scheduler queue).

Integer and load/store instruction operations read source operands according to the source physical register numbers from register file 38A and are conveyed to execution core 40A for execution. Execution core 40A executes the instruction operation and updates the physical register assigned to the destination within register file 38A. Additionally, execution core 40A reports the R# of the instruction operation and exception information regarding the instruction operation (if any) to scheduler 36. Register file 38B and execution core 40B may operate in a similar fashion with respect to floating point instruction operations (and may provide store data for floating point stores to load/store unit 42). It is noted that operands for dependent operations may be directly bypassed to the dependent operations if the operations upon which they depend are completing concurrently.

In one embodiment, execution core 40A may include, for example, two integer units, a branch unit, and two address generation units (with corresponding translation lookaside buffers, or TLBS). Execution core 40B may include a floating point/multimedia multiplier, a floating point/multimedia adder, and a store data unit for delivering store data to load/store unit 42. Other configurations of execution units are possible, including a combined floating point/integer execution core.

Load/store unit 42 provides an interface to D-cache 44 for performing memory operations and for scheduling fill operations for memory operations which miss D-cache 44. Load memory operations may be completed by execution core 40A performing an address generation and forwarding data to register files 38A–38B (from D-cache 44 or a store queue within load/store unit 42). Store addresses may be presented to D-cache 44 upon generation thereof by execution core 40A (directly via connections between execution core 40A and D-Cache 44). The store addresses are allocated a store queue entry. The store data may be provided concurrently, or may be provided subsequently, according to design choice. Upon retirement of the store instruction, the data is stored into D-cache 44 (although there may be some delay between retirement and update of D-cache 44). Additionally, load/store unit 42 may include a load/store buffer for storing load/store addresses which miss D-cache 44 for subsequent cache fills (via external interface unit 46) and re-attempting the missing load/store operations. Load/store unit 42 is further configured to handle load/store memory dependencies.

D-cache 44 is a high speed cache memory for storing data accessed by processor 10. While D-cache 44 may comprise any suitable structure (including direct mapped and set-associative structures), one embodiment of D-cache 44 may comprise a 128 Kbyte, 2 way set associative cache having 64 byte lines.

External interface unit 46 is configured to communicate to other devices via external interface 52. Any suitable external interface 52 may be used, including interfaces to L2 caches and an external bus or buses for connecting processor 10 to other devices. External interface unit 46 fetches fills for I-cache 16 and D-cache 44, as well as writing discarded updated cache lines from D-cache 44 to the external interface. Furthermore, external interface unit 46 may perform non-cacheable reads and writes generated by processor 10 as well.

Figure 2:
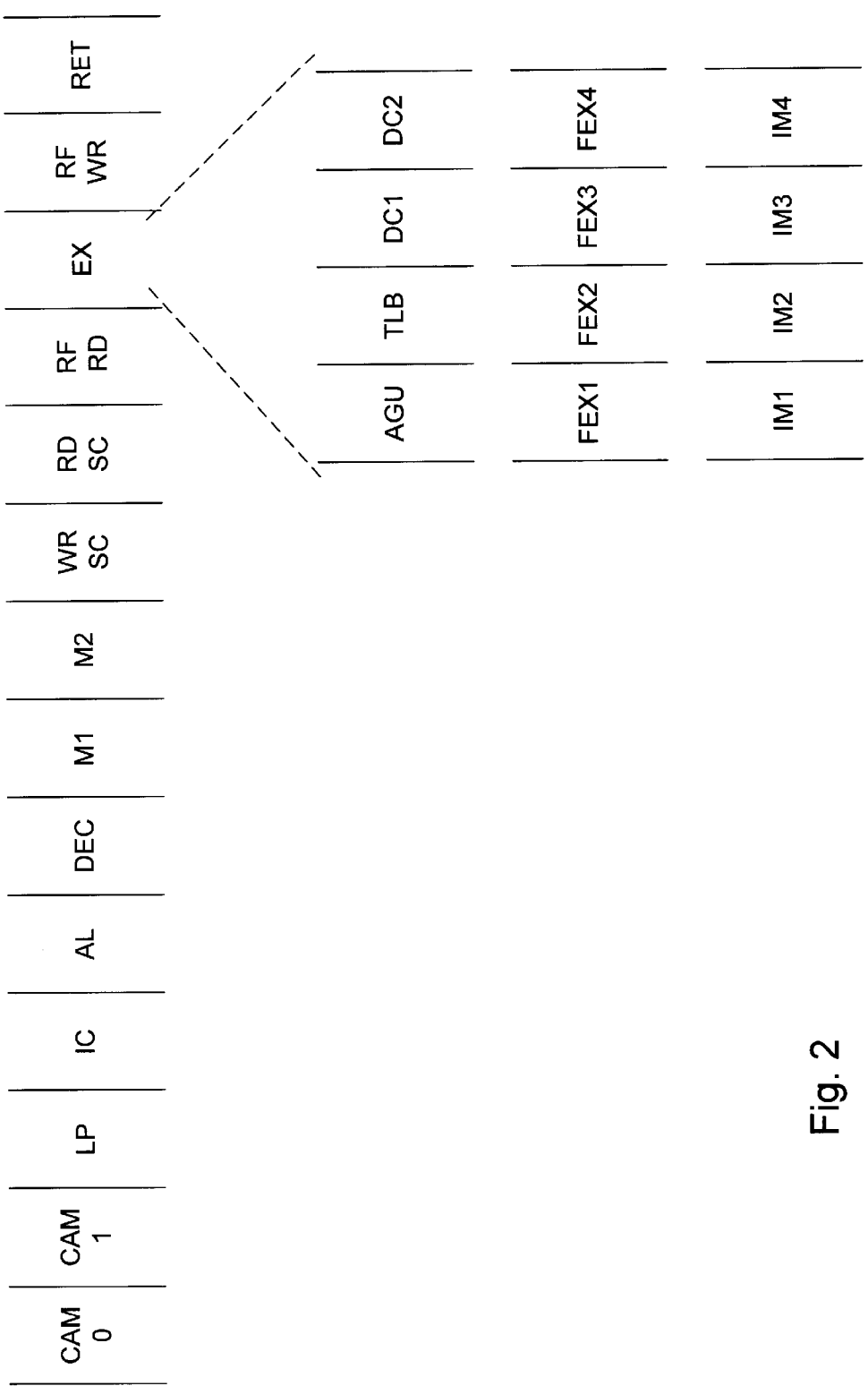
FIG. 2 is an exemplary pipeline diagram which may be employed by one embodiment of the processor shown in FIG. 1.

Turning next to FIG. 2, an exemplary pipeline diagram illustrating an exemplary set of pipeline stages which may be employed by one embodiment of processor 10 is shown. Other embodiments may employ different pipelines, pipelines including more or fewer pipeline stages than the pipeline shown in FIG. 2. The stages shown in FIG. 2 are delimited by vertical lines. Each stage is one clock cycle of a clock signal used to clock storage elements (e.g. registers, latches, flops, and the like) within processor 10.

As illustrated in FIG. 2, the exemplary pipeline includes a CAM0 stage, a CAM1 stage, a line predictor (LP) stage, an instruction cache (IC) stage, an alignment (AL) stage, a decode (DEC) stage, a map1 (M1) stage, a map2 (M2) stage, a write scheduler (WR SC) stage, a read scheduler (RD SC) stage, a register file read (RF RD) stage, an execute (EX) stage, a register file write (RF WR) stage, and a retire (RET) stage. Some instructions utilize multiple clock cycles in the execute state. For example, memory operations, floating point operations, and integer multiply operations are illustrated in exploded form in FIG. 2. Memory operations include an address generation (AGU) stage, a translation (TLB) stage, a data cache 1 (DC1) stage, and a data cache 2 (DC2) stage. Similarly, floating point operations include up to four floating point execute (FEX1–FEX4) stages, and integer multiplies include up to four (IM1–IM4) stages.

During the CAM0 and CAM1 stages, line predictor 12 compares the fetch address provided by branch prediction/fetch PC generation unit 18 to the addresses of lines stored therein. Additionally, the fetch address is translated from a virtual address (e.g. a linear address in the x86 architecture) to a physical address during the CAM0 and CAM1 stages. In response to detecting a hit during the CAM0 and CAM1 stages, the corresponding line information is read from the line predictor during the line predictor stage. Also, I-cache 14 initiates a read (using the physical address) during the line predictor stage. The read completes during the instruction cache stage.

It is noted that, while the pipeline illustrated in FIG. 2 employs two clock cycles to detect a hit in line predictor 12 for a fetch address, other embodiments may employ a single clock cycle (and stage) to perform this operation. Moreover, in one embodiment, line predictor 12 provides a next fetch address for I-cache 14 and a next entry in line predictor 12 for a hit, and therefore the CAM0 and CAM1 stages may be skipped for fetches resulting from a previous hit in line predictor 12.

Instruction bytes provided by I-cache 14 are aligned to decode units 24A–24D by alignment unit 16 during the alignment stage in response to the corresponding line information from line predictor 12. It is noted that some instructions may be aligned to more than one decode unit 24A–24D. Decode units 24A–24D decode the provided instructions, identifying ROPs corresponding to the instructions as well as operand information during the decode stage. Map unit 30 generates ROPs from the provided information during the maps stage, and performs register renaming (updating future file 20). During the map2 stage, the ROPs and assigned renames are recorded in retire queue 32. Furthermore, the ROPs upon which each ROP is dependent are determined. Each ROP may be register dependent upon earlier ROPs as recorded in the future file, and may also exhibit other types of dependencies (e.g. dependencies on a previous serializing instruction, etc.)

The generated ROPs are written into scheduler 36 during the write scheduler stage. Up until this stage, the ROPs located by a particular line of information flow through the pipeline as a unit. It is noted that ROPs comprising a microcode routine may be an exception to the aforementioned statement, since they may be read from the microcode ROM over multiple clock cycles. However, subsequent to be written into scheduler 36, the ROPs may flow independently through the remaining stages, at different times Generally, a particular ROP remains at this stage until selected for execution by scheduler 36 (e.g. after the ROPs upon which the particular ROP is dependent have been selected for execution, as described above). Accordingly, a particular ROP may experience one or more clock cycles of delay between the write scheduler write stage and the read scheduler stage. During the read scheduler stage, the particular ROP participates in the selection logic within scheduler 36, is selected for execution, and is read from scheduler 36. The particular ROP then proceeds to read register file operations from one of register files 38A–38B (depending upon the type of ROP) in the register file read stage.

The particular ROP and operands are provided to the corresponding execution core 40A or 40B, and the instruction operation is performed on the operands during the execution stage. As mentioned above, some ROPs have several pipeline stages of execution. For example, memory instruction operations (e.g. loads and stores) are executed through an address generation stage (in which the data address of the memory location accessed by the memory instruction operation is generated), a translation stage (in which the virtual data address provided by the address generation stage is translated) and a pair of data cache stages in which D-cache 44 is accessed. Floating point operations may employ up to 4 clock cycles of execution, and integer multiplies may similarly employ up to 4 clock cycles of execution.

Upon completing the execution stage or stages, the particular ROP updates its assigned physical register during the register file write stage. Finally, the particular ROP is retired after each previous ROP is retired (in the retire stage). Again, one or more clock cycles may elapse for a particular ROP between the register file write stage and the retire stage. Furthermore, a particular ROP may be stalled at any stage due to pipeline stall conditions, as is well known in the art.

Scheduler

Figure 3:
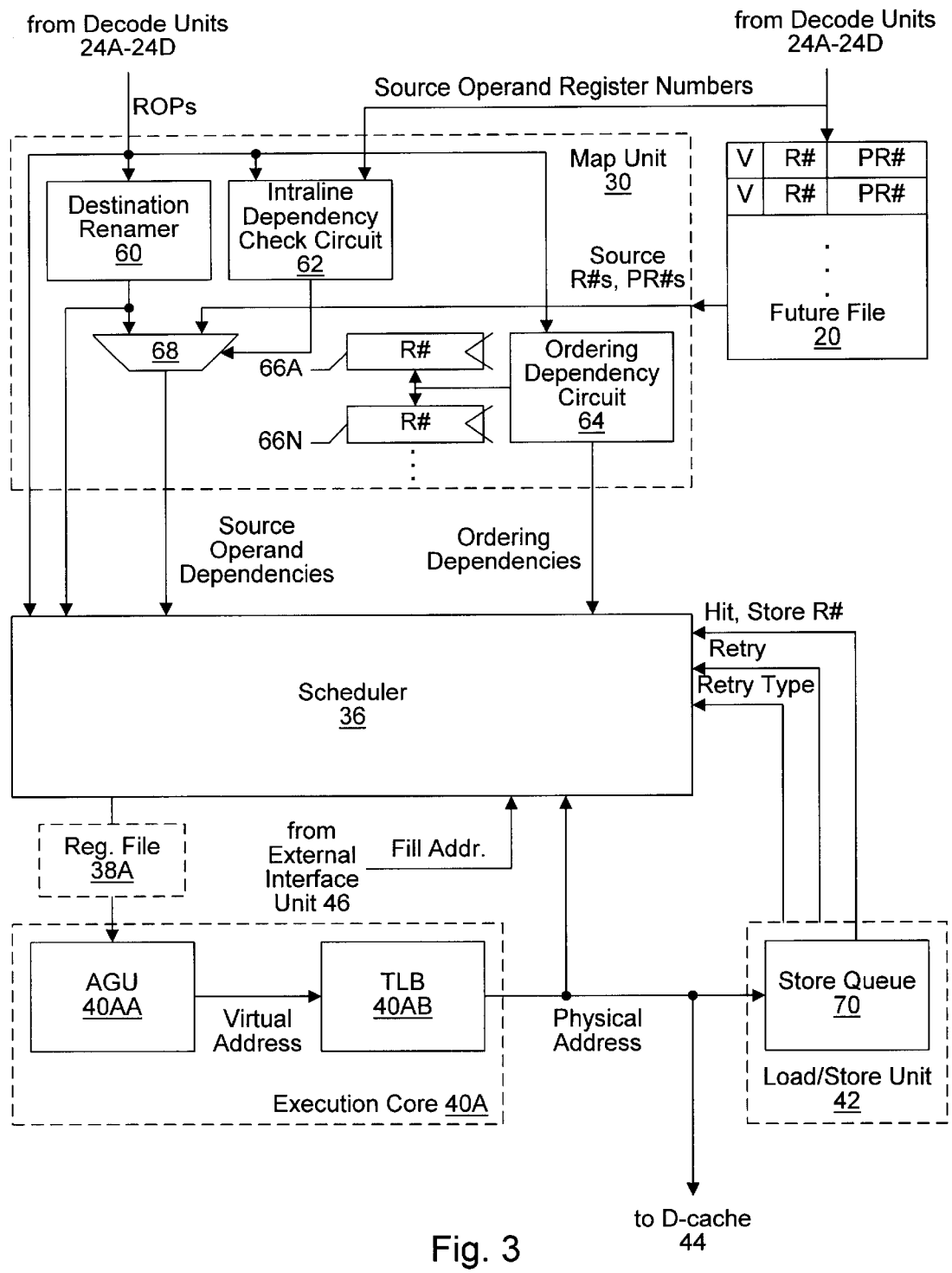
FIG. 3 is a block diagram illustrating one embodiment of the map unit, scheduler, integer execution core, and load/store unit shown in FIG. 1 in more detail.

Turning now to FIG. 3, a block diagram illustrating one embodiment of map unit 30, future file 20, scheduler 36, integer execution core 40A, and load/store unit 42 is shown. Certain exemplary interconnection is illustrated in FIG. 3, as well as certain internal details of one embodiment of the units other than scheduler 36. Other embodiments are possible and contemplated. In the embodiment of FIG. 3, map unit 30 is coupled to decode units 24A–24D, future file 20, and scheduler 36. Scheduler 36 is further coupled to external interface unit 46, integer execution core 40A, and load/store unit 42. In the embodiment of FIG. 3, map unit 30 includes a destination renamer circuit 60, an intraline dependency check circuit 62, an ordering dependency circuit 64, a set of ordering dependency registers 66A–66N, and a mux 68. Destination renamer circuit 60, intraline dependency check circuit 62, and ordering dependency circuit 64 are coupled to receive instruction operations from decode units 24A–24N. Destination renamer circuit 60 is coupled to mux 68 and scheduler 36. Intraline dependency check circuit 62 is coupled to mux 68, which is further coupled to future file 20. Future file 20 is coupled to receive source operand identifiers corresponding to the instruction operations received by map unit 30. Ordering dependency circuit 64 is coupled to ordering dependency registers 66A–66N and to scheduler 36. Load/store unit 42 includes a store queue 70 which is coupled to receive a physical address from integer execution core 40A. Integer execution core 40A includes an address generation unit 40AA coupled to a translation lookaside buffer (TLB) 40AB.

Generally, map unit 30 receives instruction operations from decode units 24A–24D. Map unit 30 performs register renaming for each instruction operation and determines the dependencies of each instruction operation on older instruction operations which are in flight within scheduler 36 (or concurrently being dispatched to scheduler 36). Map unit 30 provides the instruction operations and register renames to scheduler 36 for storage (and later issuance for execution). Additionally, map unit 30 provides an indication of the dependencies for each instruction operation (shown as the source operand dependencies and the ordering dependencies in FIG. 3). More particularly, map unit 30 identifies the older instruction operations by R# (the number identifying the instruction operation within scheduler 36). The PR#s of the physical registers assigned to the operands are provided to scheduler 36 for issuance with the instruction operation, but are not used in determining the dependencies. Scheduler 36 stores the instruction operations and corresponding dependencies, and schedules the instruction operations in response to the corresponding dependencies being satisfied. The scheduled instruction operations are issued to the execution core 40A–40B having execution resources configured to execute that instruction operation.

Certain instruction operations may not complete execution when issued. For example, in the embodiment shown, memory operations may not complete execution. If an instruction operation does not complete execution, it is "retried" by a unit involved in the execution of the instruction operation. Retrying an instruction operation involves signalling scheduler 36 that the instruction operation is being retried. Scheduler 36 retains issued instruction operations, and if the issued instruction operations are retried, then scheduler 36 reissues the instruction operations. More particularly in one embodiment, scheduler 36 maintains an execution state for each instruction operation. In response to a retry of a previously issued instruction operation, scheduler 36 resets the execution state of the instruction operation to a "not executed" state. Subsequently, the instruction operation may be reissued. Additionally, scheduler 36 retains the dependencies of each issued instruction operation. Any instruction operations which are directly or indirectly dependent on the retried instruction operation are returned to the not executed state as well. It is noted that a group of instruction operations in which the first of the group of instruction operations is dependent on a particular instruction operation and in which each other instruction operation within the group is dependent upon one of the other instruction operations and indirectly dependent on the particular instruction operation through that other instruction operation is referred to herein as a "dependency chain". Resetting the execution state to not executed in response to a retry of the instruction operation or another instruction operation on which the instruction operation is directly or indirectly dependent is also referred to herein as "undoing" that instruction operation.

By allowing instruction operations to be retried (and reissued in response to the retry), scheduler 36 may aggressively schedule instruction operations for execution and may recover from incorrect scheduling by reissuing the incorrectly scheduled instruction operations at a later time. The penalty for incorrect scheduling may be substantially less than purging the incorrectly scheduled instruction operation and all younger instruction operations and refetching beginning at the incorrectly scheduled instruction operation.

Map unit 30 employs destination renamer circuit 60, intraline dependency check circuit 62, future file 20, and ordering dependency circuit 64 to determine the dependencies for each instruction operation. Destination renamer circuit 60 receives an indication, for each instruction operation, of whether or not that instruction operation has a register destination operand and the destination register number if the instruction operation does have a register destination operand. If the instruction operation has a register destination operand, destination renamer circuit 60 assigns a free physical register number to the instruction operation. The assigned PR#s are provided with the instruction operations to scheduler 36. Additionally, destination renamer circuit 60 provides the R#s and PR#s of each instruction operand to mux 68.

Future file 20 provides, for each source operand register number, the PR# and R# of the instruction operation which most recently had the corresponding architected register as a destination operand. More particularly, future file 20 may comprise a table having entries for each architected register (and, in embodiments employing microcode, each microcode temporary register). The source operand register numbers are used to select the entries of registers specified as source.operands of the instruction operations. Each entry stores the R# of the oldest instruction operation (prior to the present line of instruction operations) to update that register and the PR# of the physical register assigned to the destination of that oldest instruction operation. Additionally, future file 20 includes a valid bit (V) in each entry. The valid bit indicates whether or not the R# recorded for that register is valid (i.e. whether or not the corresponding instruction operation is still valid in scheduler 36). The valid bit is set upon dispatch of the instruction operation corresponding to the R# into scheduler 36, and is reset when the instruction operation is retired. The valid bit is provided to scheduler 36 when the entry is selected as the source operand dependency. Scheduler 36 does not record a dependency for that source operand if the valid bit is clear, and does record a dependency if the valid bit is set.

Intraline dependency check circuit 62 receives the source and destination register numbers of each instruction operation and performs dependency checking within the line of instruction operations received by map unit 30. Intraline dependency check circuit 62 compares the destination register numbers of each older instruction operation within the line to the source register numbers of a particular instruction operation within the line. If a match is found for one of the source operands, intraline dependency check circuit 62 overrides the R# and PR# from future file 20 corresponding to that source operand with the corresponding R# and PR# provided by destination renamer circuit 60. If a match is not found, the R# and PR# from future file 20 provides the correct register rename and dependency R# for that source operand. Intraline dependency check circuit 62 generates mux select lines to mux 68 to select the appropriate R# and PR# for each source operand of each instruction operation. It is noted that mux 68 may represent any suitable selection circuit for selecting the source operand dependencies. For example, mux 68 may represent separate muxes for each possible source operand of each possible instruction operation within the line.

Intraline dependency check circuit may further compare the destination register numbers for each instruction operation within the line to determine the oldest instruction operation within the line to update each architected register which is a destination operand of one or more instruction operations within the line. Future file 20 may then be updated, in the entries corresponding to the destination operands of the line, with the R#s and PR#s assigned by destination renamer circuit 60. The update path is not shown in FIG. 3 for simplicity in the drawing.

Ordering dependency circuit 64 tracks ordering dependencies which may be recorded with respect to certain instruction operations. For example, in one embodiment employing the x86 instruction set architecture, ordering dependencies are defined for: (i) segment loads, which cause an ordering dependency for each subsequent memory operation; and (ii) floating point control word updates, which cause an ordering dependency for each subsequent floating point instruction operation. Generally, any instruction operation which creates a serialization barrier for subsequent instruction operations leads to an ordering dependency from the serializing instruction operations to subsequent affected instruction operations. A "serialization barrier" is a barrier in the program sequence around which out of order or speculative execution is prohibited. Some instruction set architectures have instructions whose only function is to provide the serialization barrier.

The above mentioned ordering dependencies may be tracked using ordering dependency registers 66A–66N. Ordering dependency circuit 64, in response to an instruction operation which creates an ordering dependency, stores the R# of the instruction operation in one of ordering dependency registers 66A–66N. One ordering dependency register 66A–66N may be provided for each ordering dependency detected by processor 10. Additionally, a valid bit may be included and may be set in response to recording an R# and reset upon retiring of the corresponding instruction operation (similar to the valid bit in future file 20). In response to an instruction operation which is defined to being ordering dependent via a particular ordering dependency, ordering dependency circuit 64 provides the corresponding R# as one of the ordering dependencies for that instruction operation.

In addition to the above specific situations, ordering dependency circuit 64 may employ a table to track previous occurrences of load memory operations which were scheduled prior to older store memory operations and subsequently found to be dependent on that older store memory operation (for the memory operand accessed by the load). The table may comprise a first table indexed by the fetch address of the load memory operation and trained with the fetch address of the older store memory operation as the dependency is detected during execution. The second table is indexed by the fetch address of the store memory operation, and is updated upon dispatch of store memory operations with the R# of the store memory operation. If the load memory operation is a hit in the table, the corresponding R# is provided as an ordering dependency for the load memory operation.

As mentioned above, scheduler 36 schedules and issues an instruction operation to a suitable execution core in response to detecting that each dependency of that instruction operation is satisfied. Particularly, memory operations are issued to an address generation unit 40AA within execution core 40A. Address generation unit 40AA receives the register operands read from integer register file 38A and generates the address of the memory operand corresponding to the memory operation. The address is a virtual address, which is translated through an address translation scheme specified by the instruction set architecture employed by processor 10 to a physical address for accessing memory (and D-cache 44). TLB 40AB is a cache for the results of previous translations, allowing for rapid translation of the virtual addresses which hit therein to corresponding physical addresses and for rapid determination of various attributes assigned to the corresponding memory locations via the translation mechanism. The combination of AGU 40AA and TLB 40AB provides a physical address to load/store unit 42 (and D-cache 44 and scheduler 36 in parallel).

Load/store unit 42 determines if the memory operation successfully completes execution or is to be retried. If a retry situation is detected, load/store unit 42 asserts the retry signal to scheduler 36 and provides the reason for retry via the retry type signals. In one embodiment, memory operations may be retried for the following reasons:

(i) the memory operation is a load memory operation which misses D-cache 44;

(ii) the memory operation requires a buffer within load/store unit 42 which is full (e.g. a miss buffer for storing miss addresses to be fetched from main memory by external interface unit 46);

(iii) the memory operation experiences a bank conflict within D-cache 44 with another memory operation concurrently accessing D-cache 44;

(iv) the memory operation is a store memory operation and requires a self-modifying code (SMC) check;

(v) the memory operation is a load memory operation which hits one or more store memory operations within store queue 70 (i.e. the one or more store memory operations supply at least one byte of the memory operand accessed by the load memory operation) and store queue 70 is unable to forward corresponding data;

(vi) the memory operation is to be executed non-speculatively.

Reason (i) is encoded as a separate retry type, for which scheduler 36 awaits a matching fill address provided by external interface unit 46 before scheduling and reissuing the load memory operation. External interface unit 46 provides the fill address to indicate that data is being provided from the fill address to D-cache 44 for storage (and hence that corresponding load memory operations may be hits in D-cache 44). Scheduler 36 records the physical address of the load memory operation (provided by execution core 40A) for comparison to the fill address. Reasons (ii), (iii), and (v) may be encoded as a single retry type, to which scheduler 36 may respond by rescheduling the corresponding memory operation without any particular wait requirements. Reason (iv) is encoded as a retry type and scheduler 36 may schedule the corresponding store memory operation for reissue after the SMC check has been completed. Reason (vi) is encoded as a retry type and scheduler 36 schedules the memory operation for reissue after the corresponding memory operation becomes non-speculative. According to one particular embodiment, a memory operation is to be performed non-speculative if the memory operation accesses a memory operand which crosses a page boundary (i.e. at least one byte of the memory operand is stored in a first page translated by a first address translation and at least one other byte of the memory operation is stored in a second page translated by a second address translation different than the first address translation), the translation indicates that the memory type of the memory operand is non-speculative, or the memory operation misses in the TLB. The first and last reasons for executing non-speculatively are design choice to simplify the hardware, and the middle reason is mandated by the instruction set architecture employed by processor 10.

It is noted that, while the above description refers to reissuing certain memory operations non-speculatively, other instruction operations may be reissued non-speculatively as well. For example, any instruction operation which experiences an exception (e.g. a trap or a fault specified by the architecture or a microarchitectural exception defined for the particular microarchitecture implemented by processor 10) may be reissued non-speculatively. In this manner, information related to the exception may be captured during the non-speculative execution. Thus, the amount of hardware employed to store and track exception information may be minimized.

Store queue 70 provides additional information regarding load memory operations which hit store memory operations within the store queue via the hit and store R# signals. The hit and store R# are provided irrespective of whether or not a retry of the load memory operation occurs. The hit signal indicates that a hit in the store queue was detected, and the store R# is the R# of the store which is hit by the load. This information may be used to cause a retry of the load memory operation if the store which is hit by the load is subsequently reexecuted (and receives a different address). The use of the store R# is described in more detail below. It is noted that, while the store R# is used in this example, any identifier which identifies the store may be used. For example, the store queue number identifying the store queue entry within store queue 70 which is hit by the load may be provided. Such embodiments are contemplated.

As noted above, store queue 70 may not be capable of forwarding data in all cases of a load memory operation hitting a store memory operation in store queue 70. For example, various bytes of the load memory operand may be provided by different stores in store queue 70. However, store queue 70 may limit the number of separate stores from which bytes of a particular load memory operand may be forwarded. For example, if store queue 70 is capable of forwarding data from up to two store memory operations, hitting on three or more store memory operations for different bytes of the particular load memory operand prevents forwarding of all of the bytes of the particular load memory operand. Additionally, some embodiments of store queue 70 may receive the store memory operand address prior to receiving the store data. If the store data is not available, store queue 70 is unable to forward the store data even though a hit may be detected.

It is noted that instruction operations are referred to herein as being "older" or "younger" than other instruction operations. A first instruction operation is "older" than a second instruction operation if the first instruction operation is prior to the second instruction operation in program order. On the other hand, a first instruction operation is "younger" than a second instruction operation if the first instruction operation is subsequent to the second instruction operation in program order. As used herein, the term "issue" refers to transmitting an instruction operation to an execution unit for execution. The term "reissue" refers to issue of an instruction operation which was previously issued (and was found to be incorrectly executed, either directly via retry or indirectly via the dependencies recorded by scheduler 36 for the instruction operation). Furthermore, the term "memory operation" is used herein to refer to an instruction operation which has a memory operation. Load memory operations have a memory source operand as a source operand (and a register destination operand) and specify the transfer of data from the memory source operand to the register destination operand. Store memory operations have a register source operand and a memory destination operand, and specify the transfer of data from the register source operand to the memory destination operand. It is noted that, although FIG. 3 illustrates on address generation unit 40AA and corresponding TLB 40AB, various embodiments may include any number of address generation units and TLBs. Load/store unit 42 may provide separate retry signals, retry type signals, hit signals, and store R#s for memory operations corresponding to each AGU.

Figure 4:
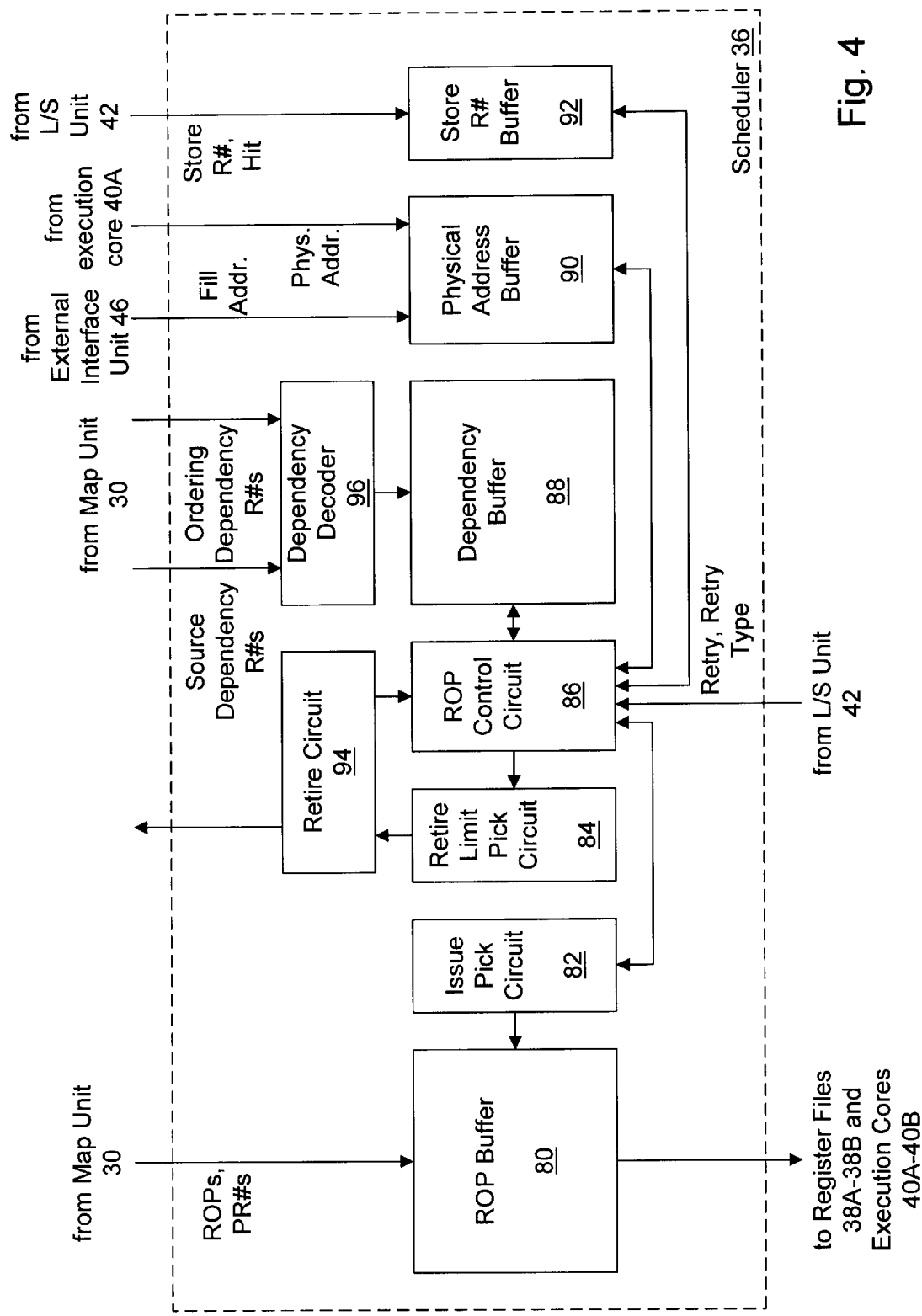
FIG. 4 is a block diagram of one embodiment of the scheduler shown in FIGS. 1 and 3.

Turning next to FIG. 4, a block diagram of one embodiment of scheduler 36 is shown. Other embodiments are possible and contemplated. As shown in FIG. 4, scheduler 36 includes a instruction operation (ROP) buffer 80, an issue pick circuit 82, a retire limit pick circuit 84, an ROP control circuit 86, a dependency buffer 88, a physical address buffer 90, a store R# buffer 92, a retire circuit 94, and a dependency decoder circuit 96. ROP buffer 80 is coupled to receive instruction operations (including such information as immediate or displacement data, etc.) and assigned PR#s from map unit 30 and is coupled to provide issued instruction operations and PR#s to register files 38A–38B and to execution cores 40A–40B. ROP buffer 80 is further coupled to issue pick circuit 82, which is coupled to ROP control circuit 86. Retire limit pick circuit 84 is coupled to retire circuit 94 and to ROP control circuit 86, which is coupled to retire circuit 94, dependency buffer 88, physical address buffer 90, and store R# buffer 92. ROP control circuit 86 is further coupled to receive the retry and retry type signals from load/store unit 42. Dependency decoder circuit 96 is coupled to receive the source dependency R#s and ordering dependency R#s from map unit 30 and is coupled to dependency buffer 88. Physical address buffer 90 is coupled to receive a fill address from external interface unit 46 and one or more physical addresses from execution core 40A. Store R# buffer 92 is coupled to receive one or more hit signals and one or more store R#s from load/store unit 42.

Dependency decoder circuit 96 receives the R#s identifying instruction operations on which each instruction operation being written into scheduler 36 is dependent and decodes the R#s into dependency indications for the corresponding instruction operation. As noted above, if an R# is indicated as invalid (e.g. from future file 20), then a dependency based upon that R# is not indicated. As opposed to providing dependency decoder circuit 96, map unit 30 may generate the dependency indications for each instruction operation directly (e.g. by providing a dependency vector such as that shown in FIG. 5 for each instruction operation). Generally, a dependency indication is assigned to a first instruction operation and a second instruction operation, and identifies a dependency (or lack thereof) of the first instruction operation on the second instruction operation. For example, each dependency indication may comprise a bit indicative, when set, of a dependency of the first instruction operation on the second instruction operation and indicative, when clear, of a lack of dependency of the first instruction operation on the second instruction operation. The set and clear meanings of the bit may be reversed in other embodiments, and other encodings of the dependency indications are possible.

Dependency decoder circuit 96 provides the dependency indications to dependency buffer 88 for storage. Dependency buffer 88 comprises multiple dependency entries, each of which is assigned to two entries in ROP buffer 80. The dependency entry stores the dependency indication which identifies the dependency or lack thereof of a first instruction operation stored in one of the two entries in ROP buffer 80 on a second instruction operation stored in the other one of the two entries. If the dependency indication indicates dependency, then the first instruction operation is not eligible for scheduling until the second instruction operation satisfies the dependency.

ROP control circuit 86 monitors the dependency indications within dependency buffer 88 and satisfaction of those dependencies, and identifies those instruction operations which are eligible for scheduling. ROP control circuit 86 identifies the eligible instruction operations to issue pick circuit 82, which scans the eligible instruction operations to select instruction operations for issue to the execution cores 40A–40B. Selected instruction operations are read from ROP buffer 80 in response to issue pick circuit 82, and provided to register files 38A–38B and execution cores 40A–40B for execution. Generally, issue pick circuit 82 is configured to select an instruction operation for each execution unit within each execution core 40A–40B (if an instruction operation of that type is eligible for scheduling). The selected instruction operation is the oldest instruction operation of that type which is eligible for scheduling. In one embodiment, issue pick circuit 82 scans the eligible instruction operations twice per clock cycle to allow selection of two instruction operations of a give type. The second scan picks a second instruction operation for issuance to a second execution unit of a given type (e.g. two address generation units and two ALUs are provided in one embodiment of execution core 40A). In the second scan, the instruction operation selected during the first scan is masked off (i.e. appears ineligible) so that the second oldest instruction operation of the corresponding type may be selected.

In one particular implementation, issue pick circuit 82 may comprise independent pick circuits for each instruction type. Each pick circuit may scan, in parallel with the operation of the other pick circuits, for instruction operations of the corresponding type. Each instruction type may use different execution resources (e.g. execution units) from the other instruction types, allowing for the independent operation of the pick circuits.

Issue pick circuit 82 reports (to ROP control circuit 86) which instruction operations have been selected for issuance. The selected instruction operations are referred to as being scheduled, and the instruction operations are issued (or reissued) once they have been read from ROP buffer 80. ROP control circuit 86 maintains an execution state for each instruction operation. The execution state may broadly be defined to include a "not executed" state, an "executing" state, and a "done" state. Each of these states may comprise multiple states, as illustrated in the exemplary state machine shown in FIG. 8, according to design choice. An instruction operation is regarded as not executed upon storage into scheduler 36, until the instruction operation is issued. The execution state of the instruction operation is changed to executing in response to being issued, and subsequently changes to the done state upon completing execution. The execution state of the instruction operation may be changed to the not executed state (or may be "undone") at any point if the instruction operation is retried (e.g. via the retry signals from load/store unit 42) or if another instruction operation on which that instruction operation depends (directly or indirectly) is undone. ROP control circuit 86 may, in general, identify a particular instruction operation as eligible for scheduling if the particular instruction operation has an execution state of not executed and if each dependency of the particular instruction operation has been satisfied.

Since the execution state of an instruction operation is changed to not executed in response to a retry for that instruction operation, the instruction operation may become eligible for rescheduling and reissue in response to the retry. However, certain retry types may specify that the instruction operation not be rescheduled until the occurrence of a subsequent event (e.g. a fill address being provided in the case of a load memory operation which misses or the instruction operation becomes non-speculative). In such cases, ROP control circuit 86 may change the execution state of the retried ROP to not executed but may not signal that the instruction operation is eligible for scheduling until the subsequent event occurs.

Since the dependency indications are not deleted from dependency buffer 88 in response to issuing the corresponding instruction operations, instruction operations within a dependency chain may be speculatively issued as the dependencies become satisfied. The dependencies of other instruction operations on a particular instruction operation are recategorized as unsatisfied if the particular instruction operation is undone, and thus those other instruction operations become undone as well. In this manner, a speculatively issued dependency chain is undone and reissued in response retry of the first instruction operation in the chain.

In addition to retries reported during the execution of a load memory operation, load memory operations may also be retried due to older store memory operations issuing subsequent to the load memory operation. Physical address buffer 90 is provided for detecting these retry scenarios. Generally, load memory operations are not indicated (via the dependency indications within dependency buffer 88) as being dependent on older store memory operations. Instead, load memory operations are scheduled without regard to older store memory operations (with the exception, in one embodiment, of the ordering dependency mechanism described above). It is possible, however, that a load memory operation may be dependent on an older store memory operation if the older store memory operation updates at least one byte of the memory operand accessed by the load memory operation. To detect these scenarios, physical address buffer 90 stores the physical address accessed by the load (received from execution core 40A). Physical address buffer 90 includes the same number of entries as ROP buffer 80, each entry capable of storing physical address information for a load memory operation and assigned to a corresponding entry in ROP buffer 80. The entry corresponding to an executing load memory operation is updated with the physical address of the load memory operation.

During the execution of store memory operations, the physical address updated by the store memory operation is provided by execution core 40A. Physical address buffer 90 compares the store address to the physical addresses within physical address buffer 90 which correspond to younger load memory operations. In other words, the address comparison is masked to those entries in physical address buffer 90 which correspond to instruction operations which are younger than the executing store memory operation. If a hit is detected of the store address on a load address, the corresponding load memory operation is undone (physical address buffer 90 signals to ROP control circuit 86 that the corresponding load memory operation has been hit, and ROP control circuit 86 changes the execution state of the corresponding load memory operation to not executed). The corresponding load memory operation is later reissued. During execution after the reissue, the load memory operation will either hit the older store memory operation in store queue 70 (and the store data will be forwarded or the load memory operation retried) or the older store memory operation will have updated the cache and/or main memory. In either case, the load memory operation receives the correct memory operand after reissuing and successfully completing execution. It is noted that, in one embodiment, if a load memory operation is undone due to an older store hitting the corresponding physical address within physical address buffer 90, the load memory operation may be trained into the table within ordering dependency circuit 64.

While physical address buffer 90 provides a mechanism for recovering from incorrect scheduling of a load memory operation prior to an older store memory operation upon which the load memory operation depends, another problem may exist which may cause the load memory operation to become undone. Even if the load memory operation is scheduled after the store memory operation on which it depends and the store data is forwarded from the store queue within load/store unit 42, the store memory operation itself may become undone. The address operands of the store memory operation (used to form the address of the store memory operation's memory operand) may be different during the reissue (i.e. receiving an incorrect address operand may be the cause of the reissue), and hence the store address may not hit physical address buffer 90 during the reissue execution and cause the load memory operation to become undone. Scheduler 36 is equipped with store R# buffer 92 to handle this possibility.

In response to detecting a hit of a load memory operation upon a store in store queue 70, load/store unit 42 provides a hit signal to scheduler 36 and the store R# of the store memory operation which is hit by the load memory operation. Similar to physical address buffer 90, store R# buffer 92 includes the same number of entries as ROP buffer 80. Each of the entries is assigned to the corresponding entry in ROP buffer 80. If the hit signal is asserted for an executing load memory operation, store R# buffer 92 stores the store R# provided by load/store unit 42.

Load/store unit 42 provides the R# of an executing store to store R# buffer 92 as well. The store R# is compared to the R#s stored in store R# buffer 92. If a match is detected, store R# buffer 92 signals ROP control circuit 86 that the corresponding load memory operation is to be undone. ROP control circuit 86 changes the execution state of the corresponding load memory operation to not executed in response to the signal. Subsequently, the load memory operation is rescheduled and reissued. It is noted that the store R# may be provided during the execution of the store memory operation from execution core 40A, if desired.

In addition to detecting the store to load dependencies as described above, physical address buffer 90 may be used for other purposes. For example, physical address buffer 90 may be used to determine when a load memory operation which missed D-cache 44 is to be reissued. The load memory operation is reissued subsequent to the corresponding data being provided by external interface unit 46. Accordingly, external interface unit 46 provides a fill address identifying fill data which is being provided to D-cache 44. Physical address buffer 90 compares the fill address to the addresses stored therein and signals any matches to ROP control circuit 86. In response, ROP control circuit 86 records that the data for the load memory operation has been provided and that the load memory operation may be rescheduled (presuming that other dependencies of the load memory operation are satisfied).

External interface unit 46 may further provide probe addresses corresponding to probes received on the external interface. Generally, probes are used to maintain cache coherency in computer systems and specify a cache block being acquired by another device and the proper cache state for the cache block if processor 10 has a copy of the cache block. If the probe address hits a load physical address within physical address buffer 90, the corresponding load may need to be rescheduled to maintain coherency and the memory ordering rules specified by the instruction set architecture employed by processor 10. For example, the x86 instruction set architecture specifies strong memory ordering. Therefore, a speculative load which is hit by a probe may need to be rescheduled if prior memory operations exist in scheduler 36 and have not executed.

As mentioned above, ROP buffer 80 stores the instruction operations and issues the instruction operations to register files 38A–38B and execution cores 40A–40B responsive to the issue pick circuit 82. ROP buffer 80 comprises a plurality of entries, each capable of storing an instruction operation. The entry assigned to a particular instruction operation is identified by the R# of the.instruction operation. Accordingly, each entry within ROP buffer 80 has: (i) a corresponding first assigned set of dependency entries in dependency buffer 88 which store dependency indications of the instruction operation within that entry on other instruction operations within scheduler 36; (ii) a corresponding second assigned'set of dependency entries which store the dependency indications of other instruction operations within scheduler 36 on the instruction operation within that entry; (iii) a corresponding physical address buffer entry; and (iv) a corresponding store R# buffer entry. Collectively, the entries within various buffers of scheduler 36 which correspond to a given R# are referred to herein as a "scheduler entry".

Retire limit pick circuit 84 and retire circuit 94 cooperate to retire instruction operations from scheduler 36. ROP control circuit 86 indicates to retire limit pick circuit which instruction operations have an execution state of done. Retire limit pick circuit 84 scans the indications from the head of scheduler 36 (i.e. the oldest instruction operation within scheduler 36) to either the first instruction operation having an execution state which is not done or a predetermined maximum number of instruction operations have been scanned and are all in a done state. Retire limit pick circuit 84 therefore determines the youngest instruction operation which may be retired. Retire limit pick circuit 84 communicates the youngest instruction operation which may be retired, and retire circuit 94 determines how many instruction operations are actually retired. Retire circuit 94 broadcasts the R# of the last instruction operation being retired, and communicates to ROP control circuit 86 which instruction operations are being retired. For each retired instruction operation, ROP control circuit 86 invalidates the corresponding entry within ROP buffer 80, physical address buffer 90, and store R# buffer 92. Additionally, for each retired instruction operation, ROP control circuit 86 clears each dependency entry in dependency buffer 88 which indicates a dependency of an instruction operation on the retired instruction operation.

As used herein, the term "buffer" refers to a memory configured to store items of information. The buffer may include one or more entries, each of which is a storage location within the memory which includes sufficient storage to store one of the items of information for which the buffer is designed.

It is noted that, while physical address buffer 90 and store R# buffer 92 are described as having the same number of entries as ROP buffer 80, other embodiments may employ buffers having fewer entries. Each entry in the buffer 90 or 92 may, for example, include a tag identifying the entry in ROP buffer 80 storing the corresponding load memory operation. It is further noted that, as mentioned previously, the store queue number may be used instead of the store R# for detecting the reissue of store memory operations which a load memory operation was detected as hitting.

Figure 5:
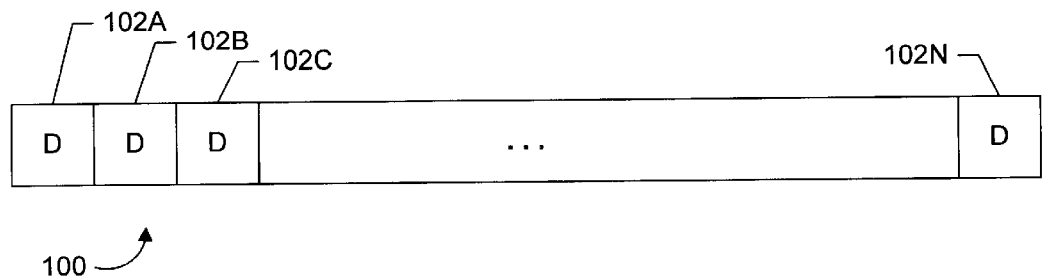
FIG. 5 is a block diagram of one embodiment of a dependency vector.

Turning now to FIG. 5, a block diagram of one embodiment of a dependency vector 100 is shown. Dependency vector 100 includes a plurality of dependency indications 102A–102N. Each dependency indication 102A–102N indicates the dependency (or lack thereof of an instruction operation corresponding to dependency vector 100 on one other instruction operation within scheduler 36. The instruction operation may thus be dependent on an arbitrary number of other instruction operations. Furthermore, since dependencies are recorded according to the instruction operation and not the type of dependency, the dependencies may be created for arbitrary reasons (e.g. to simplify the design of processor 10). As mentioned above, dependency vector 100 may be created by decoding dependency R#s provided by map unit 30 and setting corresponding dependency indications within dependency vector 100 to indicate dependency and setting the remaining dependency indications to indicate no dependency. Alternatively, map unit 30 may provide dependency vectors of the form shown in FIG. 5 to scheduler 36 for storage.

Figure 6:
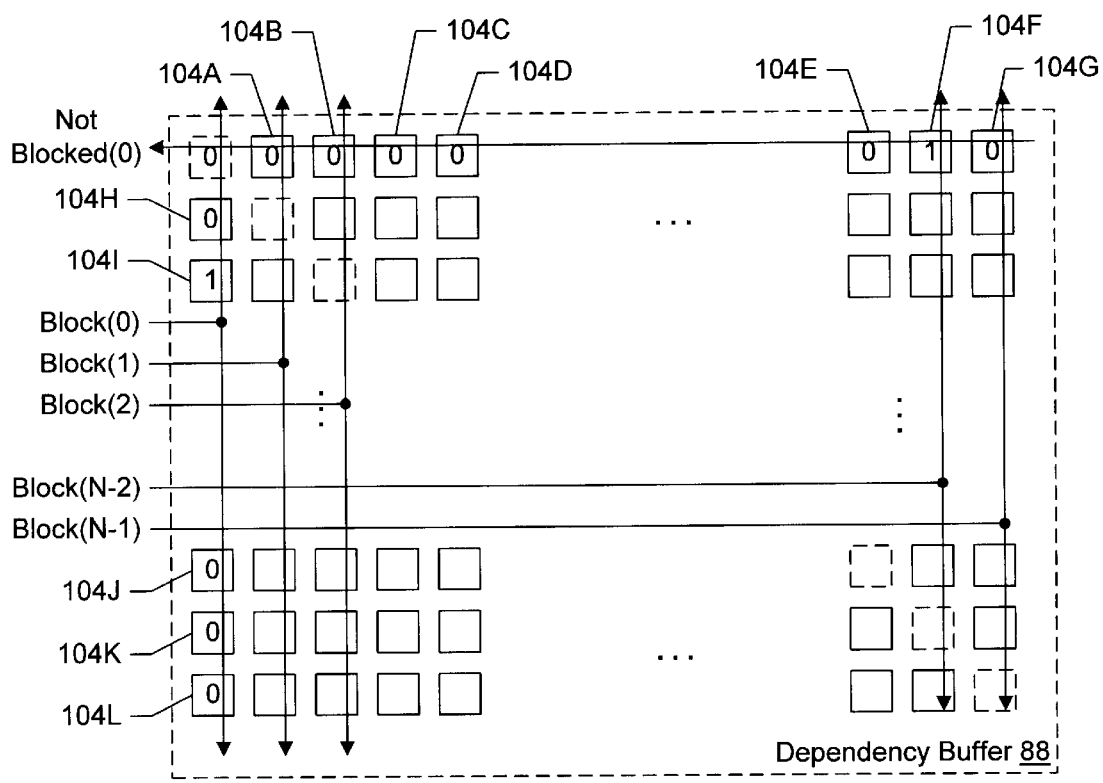
FIG. 6 is a block diagram of one embodiment of a dependency buffer.

Turning next to FIG. 6, a block diagram of one embodiment of dependency buffer 88 is shown. Other embodiments are possible and contemplated. In the embodiment of FIG. 6, dependency buffer 88 includes a plurality of dependency entries including dependency entries 104A–104L. The dependency entries which identify dependencies of a particular instruction operation stored in a particular entry of scheduler 36 (i.e. an entry in ROP buffer 80 and corresponding entries in physical address buffer 90 and store R# buffer 92) are arranged as rows and columns of dependency entries. Each row of dependency entries stores the dependency indications specifying the dependencies of a particular instruction operation within a particular scheduler entry. For example, the dependency entries identifying dependencies of the instruction operation in scheduler entry 0 are recorded in dependency entries 104A–104G (and intermediate entries within that row, not shown). The exemplary dependency indications shown in dependency entries 104A–104G illustrate dependency of the instruction operation in scheduler entry 0 on the instruction operation in. scheduler entry N−2 (dependency entry 104F). Furthermore, each column of dependency entries specifies the dependencies of each other instruction operation on a particular instruction operation. For example, the dependencies of each other instruction operation on the instruction operation in scheduler entry 0 are recorded in dependency entries 104H–104L. The exemplary dependency indications shown illustrate an dependency of the instruction operation in scheduler entry 2 on the instruction operation in scheduler entry 0 (dependency entry 104I).

Dependency buffer 88 is coupled to receive a set of input signals (Block(0) through Block(N−1)). Each Block signal corresponds to one of the scheduler entries. The Block signal, when asserted, indicates that the instruction operation stored in the corresponding scheduler entry has not satisfied dependencies on that instruction operation. When deasserted, the Block signal indicates that the dependencies on that instruction operation have been satisfied. Generally, the Block signal is asserted upon writing the corresponding instruction operation into scheduler 36 and is deasserted during execution of the corresponding instruction operation. If the instruction operation is retried or otherwise becomes undone, the Block signal is reasserted until the corresponding instruction operation is reexecuted. The Block signals are asserted and deasserted by ROP control circuit 86 according to the execution state of the corresponding instruction operation. Each Block signal is routed to the dependency entries which record dependencies of other instruction operations on the corresponding instruction operation. For example, Block(0) is routed to dependency entries 104H–104L. When the block signal is deasserted, the corresponding dependencies are considered to be satisfied. For example, when Block(0) is deasserted, the dependency of the instruction operation in scheduler entry 2 on the instruction operation is scheduler entry 0 is satisfied.

Dependency buffer 88 further provides a plurality of output signals (Not_Blocked(0) through Not_Blocked(N−1)). Each Not_Blocked signal corresponds to one of the scheduler entries. The Not_Blocked signal, when asserted, indicates that the dependencies of the instruction operation stored in the corresponding scheduler entry have been satisfied. When deasserted, the Not_Blocked signal indicates that the dependencies of the instruction operation stored in the corresponding scheduler entry have not been satisfied. Generally, the Not_Blocked signal is deasserted until the last Block signal corresponding to a dependency of the corresponding instruction operation is deasserted, and then the Not_Blocked signal is asserted. Instruction operations for which the Not_Blocked signal is asserted are eligible for scheduling, at least with respect to the dependencies of that instruction operation (i.e. other conditions, such as a retry type which specifies waiting on a subsequent event, may inhibit scheduling). Each Not_Blocked signal is routed to the dependency entries which record dependencies of the corresponding instruction operation. For example, Not_Blocked(0) is routed to dependency entries 104A–104G. The Not_Blocked signals may each be a wire-OR line which is precharged to asserted and then deasserted by one or more dependency entries for which the corresponding Block signal is asserted and the dependency indication indicates dependency.

By recording dependencies based on the position of the instruction operations within the scheduler (e.g. by R#) as opposed to based on resource or dependency reason, dependency buffer 88 may be easier to implement and to operate at high frequencies. The wiring within dependency buffer 88 may be highly regular (i.e. no area of the dependency buffer is congested with respect to wiring and there is little over lap of the wires). The regularity eases implementation and may contribute to high frequency operation (e.g. by allowing a dense implementation of dependency buffer 88).

It is noted that the dependency entries on the diagonal from the upper left to the lower right as shown in FIG. 6 would indicate a dependency of an instruction operation on itself. These dependency entries may not be implemented (as illustrated by the dotted boxes representing those entries).

As used herein, the term "asserted" refers to providing a logically true value for a signal or a bit. A signal or bit may be asserted if it conveys a value indicative of a particular condition. Conversely, a signal or bit may be "deasserted" if it conveys a value indicative of a lack of a particular condition. A signal or bit may be defined to be asserted when it conveys a logical zero value or, conversely, when it conveys a logical one value, and the signal or bit may be defined as deasserted when the opposite logical value is conveyed.

Figure 7:
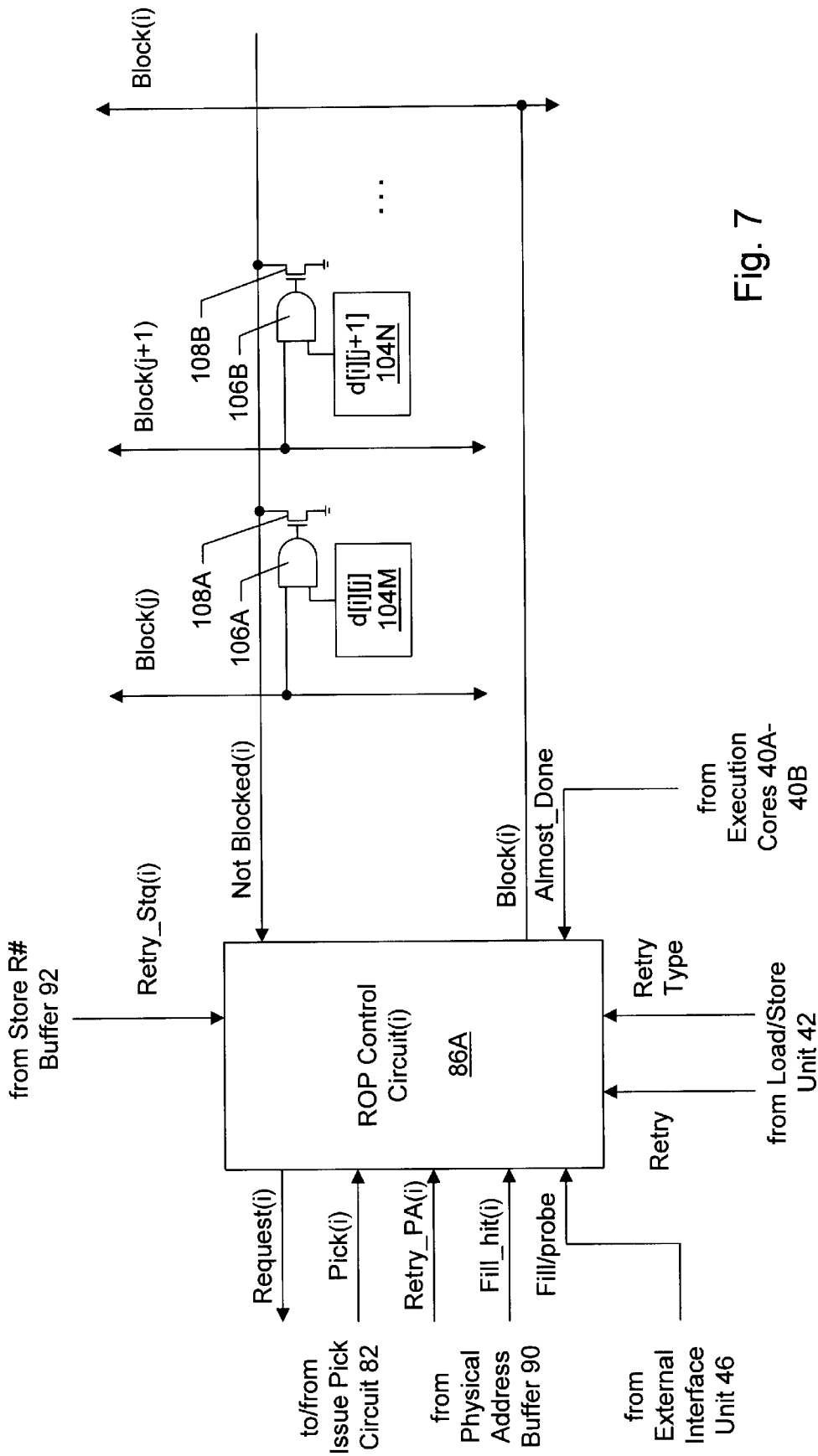
FIG. 7 is a block diagram of one embodiment of a portion of the dependency buffer shown in FIG. 6 in greater detail.

Turning now to FIG. 7, a block diagram illustrating a portion of one embodiment of dependency buffer 88 and ROP control circuit 86 is shown in more detail. Other embodiments are possible and contemplated. According to the embodiment of FIG. 7, ROP control circuit 86 comprises a plurality of independent circuits, each of which corresponds to an entry within scheduler 36. For example, entry(i) within the scheduler is represented in FIG. 7. An ROP control circuit(i) 86A is illustrated for tracking the execution state of the instruction operation stored in entry(i). Additionally, several dependency entries 104M–104N which store dependencies of the instruction operation stored in entry(i) are shown. More particularly, the dependency entries indicating a dependency of the instruction operation stored in entry(i) on the instruction operation stored in entry(j) (dependency entry 104M) and on the instruction operation stored in entry(j+1) (dependency entry 104N) are shown. The Block(i) and Not_Blocked(i) signals are shown, as well as the Block(j) and Block(j+1) signals. ROP control circuit(i) 86A is coupled to provide the Block(i) signal and is coupled to receive the Not_Blocked(i) signal. Additionally, ROP control circuit(i) 86A is coupled to receive a retry_PA(i) signal and a fill_hit(i) signal from physical address buffer 90, a fill/probe signal from external interface unit 46, a retry_stq(i) signal from Store R# buffer 92, a retry signal and retry type signals from load/store unit 42, an almost_done signal from execution cores 40A–40B, and a pick(i) signal from issue pick circuit 82. Furthermore, ROP control circuit(i) 86A is coupled to provide a request(i) signal to issue pick circuit 82.

ROP control circuit(i) 86A begins monitoring the dependencies of the instruction operation stored in entry(i) upon writing of the instruction operation into entry(i). Until the instruction operation has satisfied the dependencies of other instruction operations on that instruction operation, ROP control circuit(i) 86A asserts the Block(i) signal (which is routed to the dependency entries which record dependencies of other instruction operations on the instruction operation, as illustrated in FIG. 6). The instruction operation has not satisfied dependencies while the execution state of the instruction operation is in the not executed state and while the execution state is in the executing state but is not near enough to completing execution to have satisfied dependencies. Additionally, ROP control circuit(i) 86A monitors the Not_Blocked(i) signal to determine when the dependencies of the instruction operation have been satisfied.

Each dependency entry 104 which stores a dependency indication of the instruction operation on another instruction operation is coupled to deassert the Not_Blocked(i) signal to indicate that the instruction operation is blocked. For example, dependency entry 104M is coupled to an AND gate 106A and a transistor 108A and dependency entry 104N is coupled to an AND gate 106B and a transistor 108B. If the dependency indication stored and the dependency entry indicates a dependency and the corresponding Block signal is asserted, the AND gate activates the corresponding transistor, which deasserts the Not_Blocked(i) signal. On the other hand, if the dependency indication indicates no dependency or the Block signal is deasserted, the AND gate deactivates the corresponding transistor and that transistor does not deassert the Not_Blocked(i) signal. Accordingly, instruction operations on which the instruction operation in entry(i) is not dependent do not block the issuance of that instruction operation. Instruction operations on which the instruction operation in entry(i) is dependent block the issuance of that instruction operation until the dependency is satisfied (indicated by deassertion of the corresponding Block signal).

In response to the Not_Blocked signal being asserted, ROP control circuit(i) 86A asserts the request(i) signal to issue pick circuit 82. Issue pick circuit 82 scans the request (i) signals along with similar signals from other control circuits corresponding to other entries. Once issue pick circuit 82 schedules the instruction operation in entry(i) for issue, issue pick circuit 82 asserts the pick(i) signal. In response to the pick(i) signal, ROP control circuit(i) changes the execution state to executing. As noted above, in the present embodiment, scheduler 36 records the latency of the instruction operation and counts clock cycles from issuance of the instruction operation to determine the point at which dependencies are satisfied. Other embodiments may receive completion signals from the execution units, for example, or use any other alternative mechanism for determining when dependencies are satisfied. Additionally, in the present embodiment, certain instruction operations have a variable latency or have a longer latency than it is desired to count. For such instruction operations, execution cores 40A–40B may provide an almost_done signal. The almost_done signal is asserted when the execution cores determine that a variable latency instruction operation has reached a predetermined number of clock cycles from completion. The almost_done signal may be used by ROP control circuit(i) 86A to begin counting cycles up to the predetermined number, at which point the instruction operation has completed execution.

If the instruction operation is a memory operation, ROP control circuit(i) 86A samples the retry signal from load/store unit 42 during the clock cycle that retry status is provided for the instruction operation stored in entry(i). In response to an asserted retry signal, ROP control circuit(i) 86 changes the execution state to not executed and reasserts the Block(i) signal. In this manner, the instruction operation is returned to a pre-issue state and subsequent instruction operations in a dependency chain with the instruction operation are also returned to a pre-issue state (through deassertion of the corresponding Not_Blocked signals). Additionally, ROP control circuit(i) 86A samples the retry type signals if the retry signal is asserted. If the retry type requires a subsequent event to occur before the instruction operation is reissued, ROP control circuit(i) 86A records the event to be looked for and inhibits requesting reissue (by reasserting the request(i) signal) until the subsequent event occurs.

In addition to being retried during execution, load memory operations may be retried due to an executing store memory operation's physical address hitting the load memory operation's physical address (stored in physical address buffer 90) or the R# of the executing store memory operation hitting the store R# recorded for the load memory operation. Physical address buffer 90 asserts a retry_PA(i) signal to communicate the former case to ROP control circuit(i) 86A (and may include similar signals for each other entry). Store R# buffer 92 asserts a retry_stq(i) signal to communicate the latter case (and may include similar signals for each other entry). In response to assertion of either signal, ROP control circuit(i) 86A changes the execution state to not executed and reasserts the Block(i) signal. Assuming that the Not_Blocked(i) signal is asserted, ROP control circuit(i) 86A may assert the request(i) signal to request rescheduling and reissuance of the instruction operation.

In addition to the retry, retry_PA(i), and retry_stq(i) signals, the execution state of the instruction operation may be returned to not executed if the Not_Blocked(i) signal is deasserted. This mechanism is used to undo the done state of a dependency chain when an instruction operation at the beginning of the chain is undone, to cause the reissuance of the instruction operations within the dependency chain. Accordingly, if the Not_Blocked(i) signal is deasserted, ROP control circuit(i) 86A changes the execution state to not executed and reasserts the Block(i) signal (which may subsequently cause other Not_Blocked signals to deassert, further undoing the dependency chain).

Physical address buffer 90 provides an additional signal to ROP control circuit(i) 86A to indicate if an address provided by external interface unit 46 hits the load's physical address in physical address-buffer 90, shown in FIG. 7 as fill_hit(i). Physical address buffer 90 asserts the fill_hit(i) signal to indicate that the address provided by external interface unit 46 hits the physical address in physical address buffer 90 assigned to entry(i). External interface unit 46 also provides fill/probe signals to indicate the type of address being provided. If the fill/probe signals indicate fill, than the assertion of the fill_hit(i) is an indication that the fill data for the cache line including the physical address of the load memory operation is being provided. If the load memory operation is inhibited from scheduling due to detecting a cache miss during a previous issuance, the load memory operation may be eligible for rescheduling and ROP control circuit(i) 86A may assert the request(i) signal in response to the fill address hit. The above mentioned embodiment also provides addresses from external interface unit 46 to accomplish probes. If the fill_hit(i) signal is asserted and the fill/probe signals from external interface unit 46 indicate probe, then a probe hit which may require corrective action is detected. In one embodiment, assertion of the fill_hit(i) signal for a probe may cause ROP control circuit(i) 86A to change the execution state to not executed. Other embodiments may attempt more elaborate mechanisms to ensure memory ordering without unduly reissuing instruction operations. For example, ROP control circuit(i) 86A may record the hit by the probe address. If an older load memory operation is subsequently retired from the scheduler, then ROP control circuit(i) 86A may change the execution state to not executed. Other alternatives are possible as well.

Figure 8:
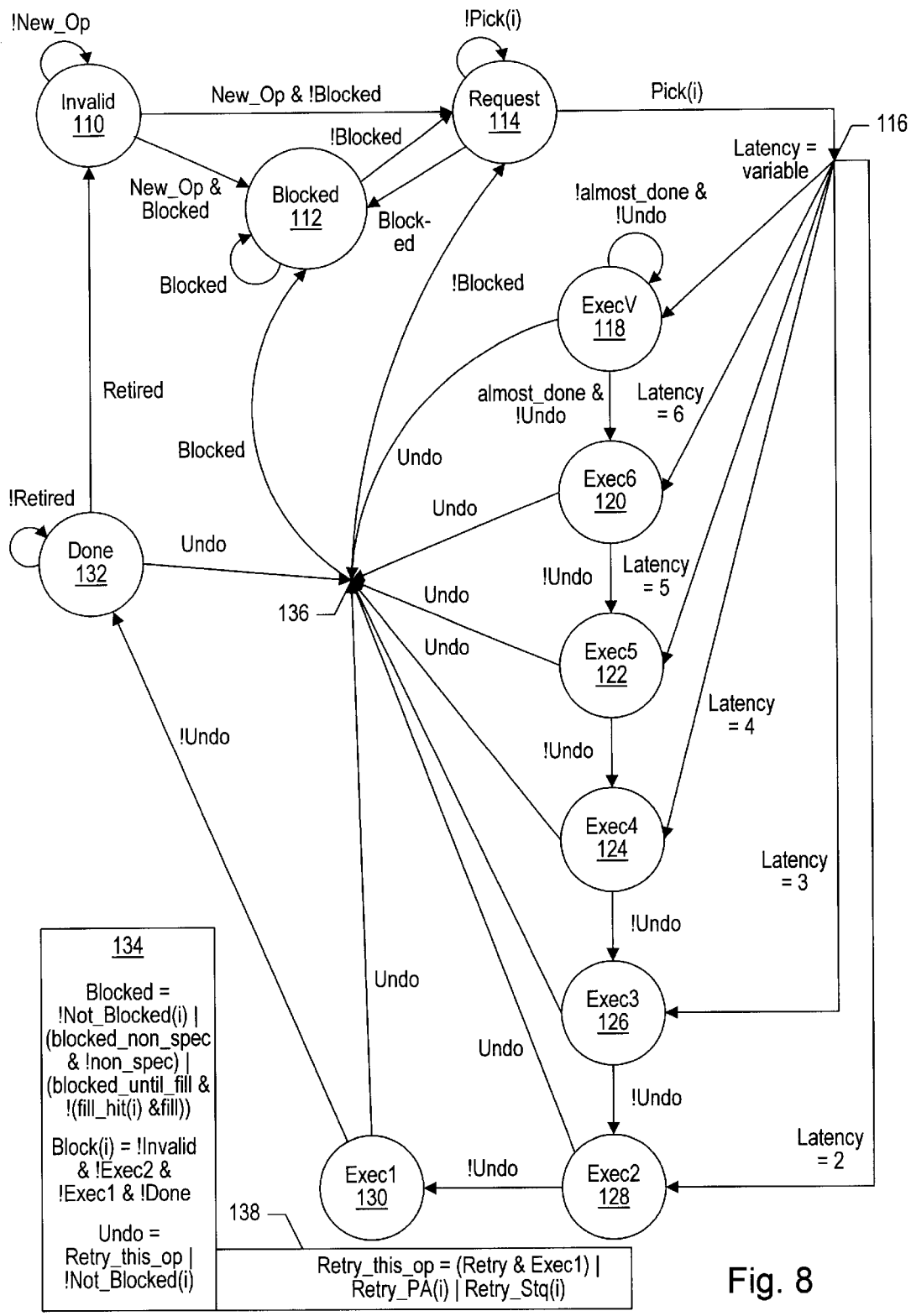
FIG. 8 is a state machine diagram with respect to one instruction operation within one embodiment of the scheduler.

Turning next to FIG. 8, an exemplary state machine is shown which may be employed by one embodiment of ROP control circuit(i) 86A. Other control circuits may employ similar state machines. Other embodiments are possible and contemplated. In the embodiment of FIG. 8, the state machine includes an invalid state 110, a blocked state 112, a request state 114, an execute variable (ExecV) state 118, an Exec6 state 120, an Exec5 state 122, an Exec4 state 124, an Exec3 state 126, an Exec2 state 128, an Exec1 state 130, and a done state 132.

The state machine begins in the invalid state 110 when the corresponding entry is not storing an instruction operation. In response to an instruction operation being written to the corresponding entry, the state machine transitions to either blocked state 112 or request state 114. Blocked state 112 is selected if the instruction operation has one or more unsatisfied dependencies. In other words, blocked state 112 is selected if the Not_Blocked(i) signal is deasserted, and the request state 114 is selected if the Not_Blocked(i) signal is asserted. In other embodiments, instruction operations may be written into the scheduler with predetermined wait events which block the instruction operation from being scheduled even if all dependencies are satisfied (in a manner similar to the events which may inhibit rescheduling after an instruction operation has been returned to the not executed state). Such instruction operations may cause a transition to the blocked state 112 even if the Not_Blocked(i) signal is asserted.

The state machine remains in blocked state 112 until the instruction operation becomes unblocked. While the transition from invalid state 110 to blocked state 112 or request state 114 may be based on the Not_Blocked(i) signal in the present embodiment, the transition from blocked state 112 to request state 114 considers the effects of retry situations which specify that a subsequent event is to occur before the instruction operation is eligible for rescheduling. Box 134 in FIG. 8 includes an equation for the blocked transition term used on the arrows in FIG. 8 for the embodiment described above. More particularly, an instruction operation is blocked if the Not_Blocked(i) signal is deasserted, or a previous issuance resulted in a determination that the instruction is operation is to be executed non-speculatively (blocked_non_spec) and is still speculative, or a previous issuance resulted in a cache miss (blocked_until_fill) and the fill data has not yet been provided. Other embodiments may include additional events which block rescheduling, as desired. Once the instruction operation is no longer blocked, the state machine transitions from blocked state 112 to request state 114.

While the state machine is in request state 114, ROP control circuit(i) 86A asserts the request(i) signal. If the instruction operation becomes blocked again while in request state 114, the state machine transitions to blocked state 112. The state machine transitions from request state 114 to one of states 118–128 (based on the latency of the instruction operation) in response to an assertion of the pick(i) signal. The state transitioned to in response to the pick(i) signal may correspond, in one embodiment, to the read scheduler stage of the pipeline of FIG. 2.

The present embodiment supports latencies of two to six clock cycles, and a variable latency greater than six clock cycles. The state machine remains in the ExecV state 118 until the almost_done signal is asserted by execution cores 40A–40B, and then transitions to the Exec6 state 120. Each of Exec6 state 120 through Exec2 state 128 transition to the next lower state in the latency chain if the instruction operation is not undone, as shown in FIG. 8. From Exec1 state 130, the state machine transitions to the done state 132 if the instruction operation is not undone. Finally, the state machine transitions from done state 132 to invalid state 110 if the instruction operation is not undone prior to retirement.

For clarity in the drawing, the pick(i) signal is shown as going to a picked node 116, from which one of states 118–128 is entered. Picked node 116 is used merely to reduce clutter in the drawing, and is not intended to represent a separate state.

In the present embodiment, the latency of the instruction operation for purposes of the state machine of FIG. 8 is the number of clock cycles before the instruction operation has satisfied dependencies on that instruction operation. This latency may expire prior to the instruction operation returning execution status information (e.g. whether or not the instruction operation experiences an exception). However, the state machine takes advantage of the pipeline delay between an instruction operation being scheduled and that instruction operation reading operands from register files 38A–38B to indicate that dependencies are satisfied prior to the dependencies actually being physically satisfied via update of the register files. Accordingly, the Block(i) signal is deasserted if the instruction operation has reached the Exec2 state 128. in the present embodiment, and remains deasserted if the state machine is in Exec1 state 130, done state 132, or invalid state 134 (see box 134). The Block(i) signal is asserted for other states.

At any point after being scheduled (pick(i) asserted), the instruction operation may become undone and returns to a not executed state. This operation is illustrated in FIG. 8 by each of the states 118–132 showing a transition based on an "undo" equation (box 134) to a central point 136, from which a transition to either blocked state 112 or request state 114 is performed based on the blocked equation illustrated in box 134. Central point 136 is used merely to reduce clutter in the drawing, not to indicate a separate state. For each of the states which shows a transition to central point 136, a transition to blocked state 112 is performed if the undo equation is true and the blocked equation is true, and a transition to request state 114 is performed if the undo equation is true and the blocked equation is false.

In the present embodiment, an instruction operation becomes "undone" (i.e. returns to an execution state of not executed) if the instruction operation is directly retried or if the Not_Blocked(i) signal becomes deasserted. The undo equation in box 134 illustrates the retry condition as a retry_this_op value to indicate the instruction operation in entry(i) was retried. A box 138 is further shown illustrated the retry_this_op value as an equation which may be true if the retry_PA(i) signal or retry_stq(i) signal is asserted, or if the instruction operation is retried during execution (e.g. the retry signal from load/store unit 42). The retry_this_op equation further illustrates the sampling of the retry signal when the instruction operation is in Exec1 state 130. In the present embodiment, retry situations are reported by load/store unit 42 when the corresponding instruction operation is in Exec1 state 130. Other embodiments may report status at different points during the execution of an instruction operation, according to design choice. Furthermore, embodiments which retry instruction operations other than memory operations may sample those retry signals at other points in the execution of those instruction operations, according to design choice.

As mentioned above, the execution state of an instruction operation may broadly include not executed, executing, and done states. For the embodiment of FIG. 8, the not executed state may comprise blocked state 112 or request state 114. The executing state may comprise execute states 118–130. The done state may comprise done state 132. It is noted that the number of execute states 118–130 is implementation specific and may be varied according to design choice. Furthermore, the point in the execution of instruction operations at which dependencies are satisfied may be varied according to design choice. The variation may be based, in part, on the number of pipeline stages between the stage at which the dependent instruction operation is scheduled and a particular stage at which the satisfaction of the dependencies, such as operand or ordering dependencies, being satisfied is needed. In the present embodiment, the particular stage is the register file read stage.

Figure 9:
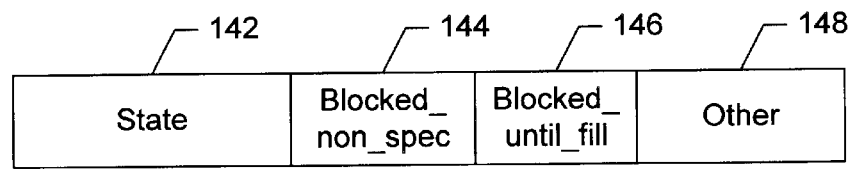
FIG. 9 is a block diagram illustrating state information stored for each instruction operation within one embodiment of the scheduler.

Turning now to FIG. 9, a register 140 is shown which may be employed by ROP control circuit(i) 86A to store states of the state machine of FIG. 8 and additional state as may be desired. Other embodiments are possible and contemplated. In the embodiment of FIG. 9, register 140 may store a state 142, a blocked_non_spec indication 144, a blocked_until_fill indication 146, and other information 148.

State 142 stores the current state of the state machine illustrated in FIG. 8. The states may be encoded in state 142 in any suitable manner. Register 142 is updated each clock cycle according to the state transitions illustrated in FIG. 8.

Blocked_non_spec indication 144 may be set to indicate blocked in response to receiving the retry signal from load/store unit 42 during execution of the instruction operation if the retry type indicates that the instruction operation is to be executed non-speculatively. The Blocked_non_spec indication 144 may be used in the blocked equation shown in box 134 in FIG. 8. More particularly, while the Blocked_non_spec indication 144 indicates blocked, the instruction operation is inhibited from requesting scheduling until the instruction operation becomes non-speculative. In response to the instruction operation becoming non-speculative, the Blocked_non_spec indication may be set to indicate not blocked and the instruction operation may be scheduled. In one particular embodiment, the instruction operation becomes non-speculative if each older instruction operation within scheduler 36 has an execution state of done.

Blocked_until_fill indication 146 may be set to indicate blocked in response to receiving the retry signal from load/store unit 42 during execution of the instruction operation if the retry type indicates that the instruction operation misses D-cache 44. The Blocked_until_fill indication 146 may be used in the blocked equation shown in box 134 in FIG. 8. More particularly, while the Blocked_until_fill indication 146 indicates blocked, the instruction operation is inhibited from requesting scheduling until the corresponding fill data is to be provided. In response to the fill data being indicated as being provided, the Blocked_until_fill indication may be set to indicate not blocked and the instruction operation may be scheduled.

Other information may be recorded in other information field 148 as desired. For example, certain embodiments may inhibit retiring a store operation until an SMC check is performed. Other information field 148 may record the requirement to wait for the SMC check and may record the completion of the SMC check. Any other information may be recorded. Furthermore, embodiments in which no other information is recorded are contemplated.

Figure 10:
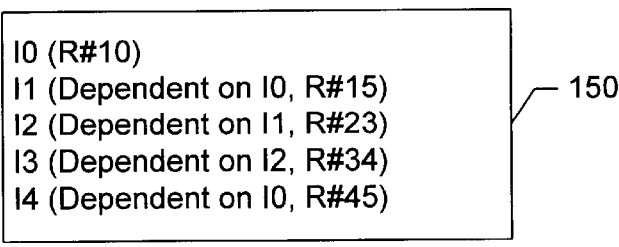
FIG. 10 is a timing diagram illustrating the undoing of a dependency chain.
Figure 10:
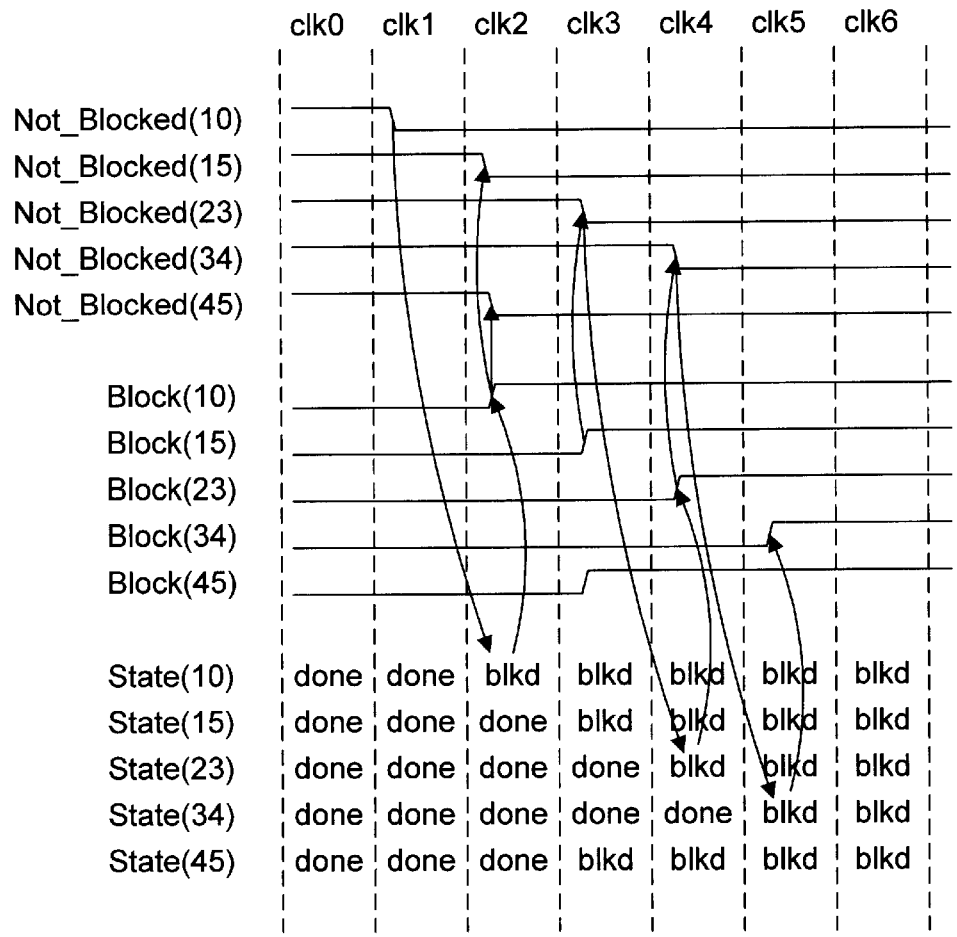

Turning now to FIG. 10, a timing diagram is shown illustrating an example of undoing a dependency chain according to one embodiment of scheduler 36. Clock cycles are delimited by vertical dashed lines, with an identifier for each clock cycle at the top between the vertical dashed lines delimiting that clock cycle. States for each the instruction operations (as recorded by ROP control circuit 86) are shown in FIG. 10 as well (next to the word "State" and the R# of the corresponding instruction operation in parentheses), with "done" signifying done state 132 and "blkd" signifying blocked state 112. FIG. 10 includes a box 150 illustrating two dependency chains. The first dependency chain begins with an instruction operation I0, assigned an R# of 10, and further includes instruction operations I1, I2, and I3. Instruction operation I1 is dependent on I0 and has an R# of 15. Instruction operation I2 is dependent on I1 and has an R# of 23. Instruction operation I3 is dependent on I2 and has an R# of 34. Instruction operation I4 is in a second dependency chain initiated by I0, and hence is dependent on I0. Instruction operation I4 has an R# of 45. I1 and I4 are directly dependent on I0, while I2 and I3 are indirectly dependent on I0. The Block and Not_Blocked signals for each instruction operation are illustrated in FIG. 10 (with the R# of the instruction operation provided in parentheses). Certain events which cause other events are illustrated by arrows from the event to the resulting event. For example, the deassertion of Not_Blocked(10) causes State(10) to changed to blocked, illustrated by an arrow from the deassertion of Not_Blocked(10) to the blocked state of State(10).

During clock cycle clk0, each of the instruction operations is in the done state. Accordingly, the corresponding Block signals are deasserted and the Not_Blocked signals are asserted. During clock cycle clk1, the Not_Blocked(10) signal is deasserted (due to one or more instruction operations on which I0 depends becoming undone). In response to the deassertion of Not_Blocked(10), the state machine for I0 (State(10)) returns to the blocked state, and thus the Block(10) signal is reasserted in clock cycle clk2. In response to the assertion of Block(10) and the recorded dependency of I1 and I4 on I0, the Not_Blocked(15) and Not_Blocked(45) signals deassert (clock cycle clk2). The deassertion of the Not_Blocked(15) and Not_Blocked(45) signals, in turn, leads to the undoing of I1 and I4 (State(15) and State(45) change to the blocked state in clock cycle clk3). Subsequently, I2 and I3 are undone due to their direct dependencies on I1 and I2, respectively, and thus by their indirect dependencies on I0. By the end of clock cycle clk5, the dependency chains in the illustrated example have been undone and the execution states corresponding to each instruction operation (I0 through I4) are in a not executed state. Subsequently, the instruction operations may receive satisfaction of their dependencies and may reissue, in turn, as the instruction operations within the dependency chains reissue and satisfy the dependencies of other instruction operations within the dependency chains.

It is noted that, while the Block and Not_Blocked signals are shown in FIG. 10 (and FIGS. 11, 12, and 15 below) as being asserted or deasserted during a particular clock cycle, the Block signals may be inactive during a first portion of the clock cycle to allow the Not_Blocked signals to be precharged, and then the Block signals may pulse during the second portion of the clock cycle (and Not_Blocked signals may be discharged or remain precharged, according to the recorded dependencies). Furthermore, the timing diagrams of FIGS. 10, 11, 12, and 15 illustrate the transition of the Not_Blocked signals based on the transition of the Block signals illustrated. Accordingly, the examples illustrate an example in which the dependencies of the illustrated dependency chains are the last dependencies to be satisfied for each instruction operation within the dependency chain. If other dependencies remained unsatisfied, the Not_Blocked signals would remain deasserted until satisfaction of those other dependencies. Similarly, the timing diagrams illustrate instruction operations being scheduled immediately in response to request for simplicity in the timing diagrams. However, the scheduling may be delayed by one or more clock cycles if other, younger instruction operations of the same type are requesting scheduling.

Figure 11:
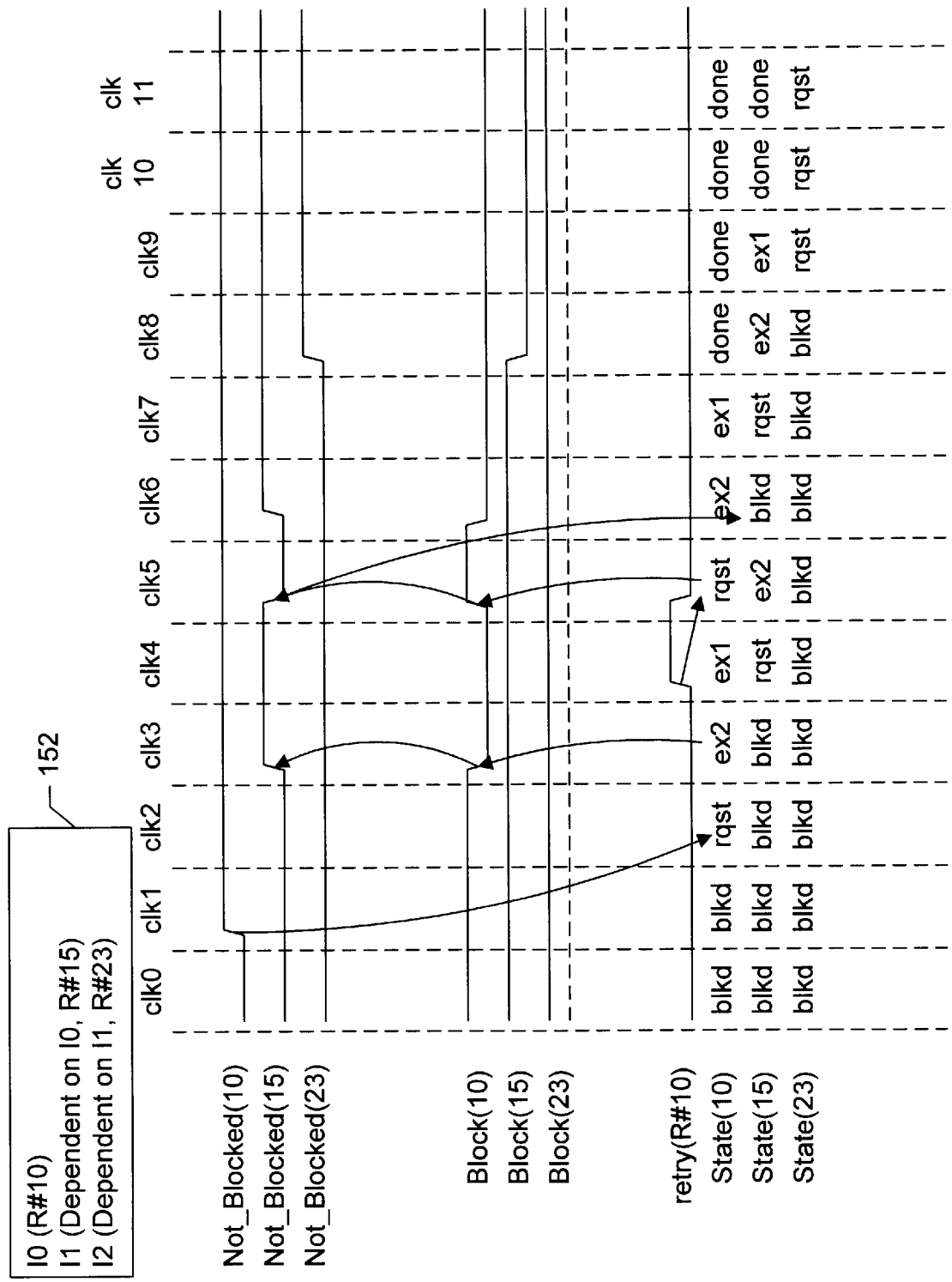
FIG. 11 is a timing diagram illustrating the issuance and reissuance of instruction operations from one embodiment of the scheduler.

Turning now to FIG. 11, a timing diagram illustrating the issuance and reissuance of exemplary instruction operations in a dependency chain, the reissuance occurring due to a retry of the first instruction operation in the dependency chain. Clock cycles are delimited by vertical dashed lines, with an identifier for each clock cycle at the top between the vertical dashed lines delimiting that clock cycle. A box 152 illustrates the exemplary dependency chain, which is instruction operations I0 through I2 from the example of FIG. 10. The Block and Not_Blocked signals for each instruction operation are illustrated, as well as the states of each instruction operation (as recorded by ROP control circuit 86), similar to the example of FIG. 10. The states illustrated in FIG. 11 include the blocked and done states, represented by "blkd" and "done" in FIG. 11 similar to FIG. 10. Also, request state 114, Exec2 state 128, and Exec1 state 130 are illustrated as "rqst", "ex2", and "ex1", respectively. Again similar to FIG. 10, certain events which cause other events are illustrated by arrows from the causing event to the resulting event. In this example, instruction operations I0 and I1 are both of latency 2.

Clock cycle clk0 illustrates each of the instruction operations I0–I2 in a blocked state, awaiting dependency satisfaction before becoming eligible for issue. Each of the Not_Blocked signals is deasserted, and each of the Block signals is asserted. During clock cycle clk1, Not_Blocked(10) asserts. Responsive to the assertion of Not_Blocked(10), state(10) changes to the request state during clock cycle clk2. I0 is picked for issue and thus State(10) transitions to the Exec2 state in clock cycle clk3. State(10) transitions to the Exec1 states in clock cycle clk4.

Responsive to the Exec2 state of state(10), Block(10) is deasserted (which in turn results in Not_Blocked(15) being asserted) during clock cycle clk4. State(15) transitions to the request state in clock cycle clk4 in response to the assertion of Not_Blocked(15), and to the Exec2 state in clock cycle clk5 in response to being picked.

During the Exec1 state of state(10) (clock cycle clk4), ROP control circuit 86 detects a retry of I0 (illustrated in FIG. 10 via the retry(R#10) signal). The retry causes an undoing of 10, and thus State(I0) transitions to a not executed state in clock cycle clk5. More particularly, since the Not_Blocked(10) signal is asserted during clock cycle clk4, State(10) transitions to the request state. Responsive to State(10) returning to a not executed state, the Block(10) signal is reasserted (and hence the Not_Blocked(15) is deasserted. The deassertion of Not_Blocked(15) results in the return of State(15) to a not executed state (clock cycle clk6).

The retry of I0 in this example is of a retry type which allows immediate reissuance of I0. Accordingly, State(10) is in the request state in clock cycle clk5. I0 is picked for execution, and thus State(10) transitions to the Exec2, Exec1, and done states in clock cycles clk6, clk7, and clk8, respectively. During the reexecution of I0, a retry does not occur. It is noted, however, that retries may occur multiple times before a particular instruction operation successfully completes.

Once State(10) reaches the Exec2 state during: the reexecution of I0 (clock cycle clk6), The Block(10) signal is deasserted and the Not_Blocked(15) signal is asserted. Responsive to the assertion of the Not_Blocked(15) signal, State(15) transitions to the request state (clock cycle clk7)

and subsequently to the Exec2 state in response to be selected for issue (clock cycle clk8). State(15) transitions to the Exec1 and Done states in clock cycles clk9 and clk10, respectively.

Responsive to State(15) reaching the Exec2 state (clock cycle clk8), the Block(15) signal is deasserted. The Not_Blocked(23) signal asserts during clock cycle clk8 in response to the deassertion of Block(15), and thus State(23) transitions to the request state in clock cycle clk9. Issuance of I2 may occur during a later clock cycle (not shown).

Figure 12:
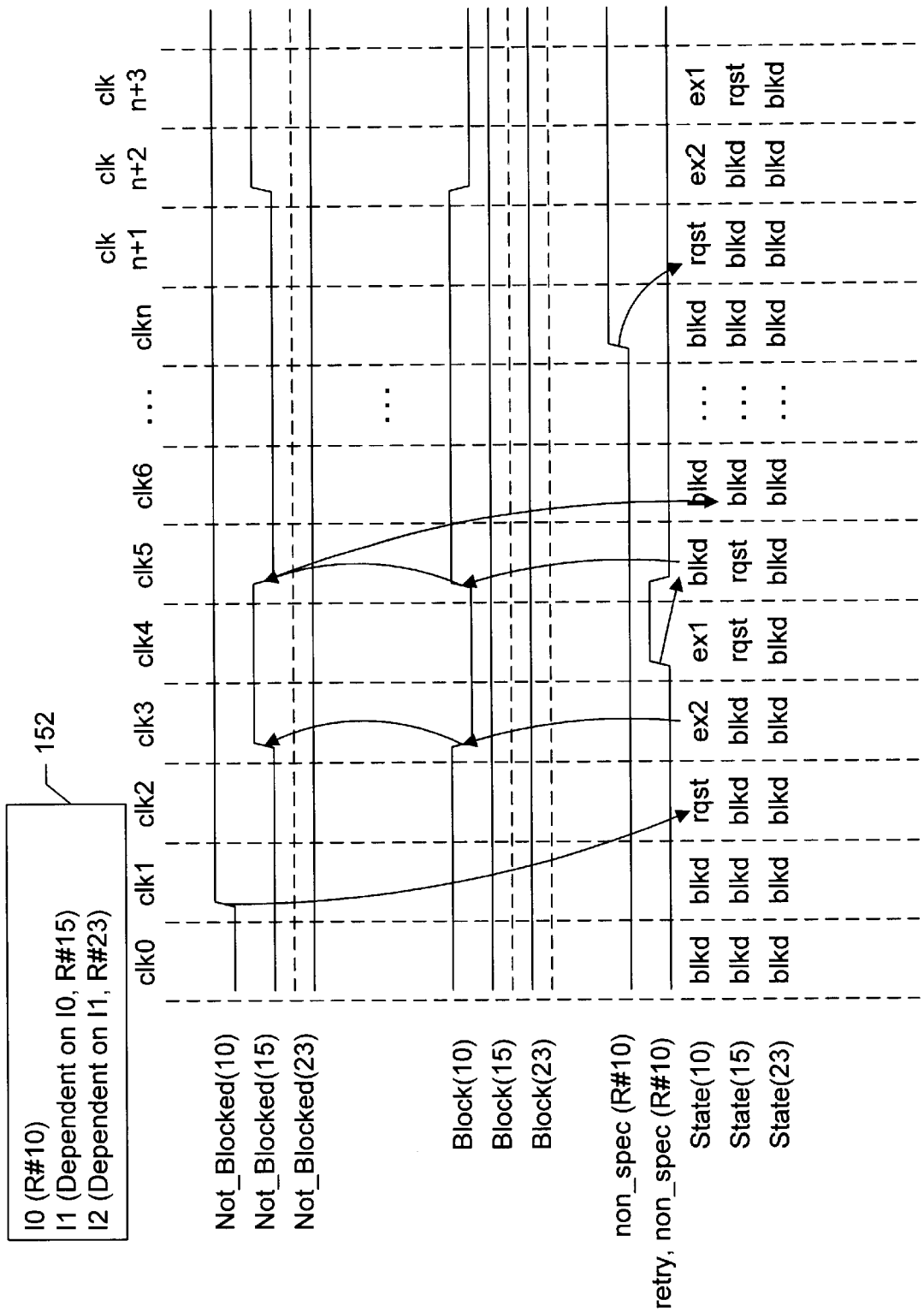
FIG. 12 is a timing diagram illustrating the issuance and non-speculative reissuance of instruction operations from one embodiment of the scheduler.

Turning now to FIG. 12, a timing diagram illustrating a retry of an instruction operation with a retry reason which requires a subsequent event to occur before rescheduling of the instruction operation is performed. More particularly, FIG. 12 illustrates a retry of an instruction operation which is to execute non-speculatively. Clock cycles are delimited by vertical dashed lines, with an identifier for each clock cycle at the top between the vertical dashed lines delimiting that clock cycle. A box 152 illustrates the exemplary dependency chain, which are the same instruction operations I0 through I2 and dependencies from the example of FIG. 11. The Block and Not_Blocked signals for each instruction operation are illustrated, as well as the states of each instruction operation (as recorded by ROP control circuit 86), similar to the example of FIG. 11. The states illustrated in FIG. 12 are represented in a manner similar to FIG. 11. Again similar to FIG. 11, certain events which cause other events are illustrated by arrows from the event to the resulting event. In this example, instruction operation I0 is of latency 2.

Clock cycles clk0 through clk6 are similar to the corresponding clock cycles clk0 through clk6 of FIG. 11, with the exception that the retry of I0 in clock cycle clk4 is indicated as a retry because I0 is to be executed non-speculatively. Thus, I0 was issued speculatively and its non-speculative nature was discovered after issuance. Scheduler 36 resolves this situation by undoing I0 (and its dependent instruction operations I1 and I2) and waiting for I0 to become non-speculative before allowing reissue. More particularly, in response to the retry type being "wait for non-speculative", ROP control circuit 86 may set the Blocked_non_spec indication corresponding to I0. Thus, ROP control circuit 86 is inhibited from requesting scheduling of I0 until I0 becomes non-speculative even though the Not_Blocked(10) signal is asserted. Some number of clock.cycles may elapse, and then ROP control circuit 86 may determine that I0 is non-speculative (e.g. clock cycle clkn in FIG. 12, illustrated by the assertion of the non-spec(R#I0) signal in FIG. 12). As mentioned above, an instruction operation may be non-speculative when each prior instruction operation (in program order) within scheduler 36 is in the done state, according to one embodiment.

In response to I0 becoming non-speculative, State(I0) transitions to the request state (clock cycle clkn+1). Subsequently, I0 is selected for issue (Exec2 state of State (I0) in clock cycle clkn+2) and executes. Dependent instruction operations I1 and I2 may subsequently be executed as their dependencies on I0 are satisfied.

Figure 13:
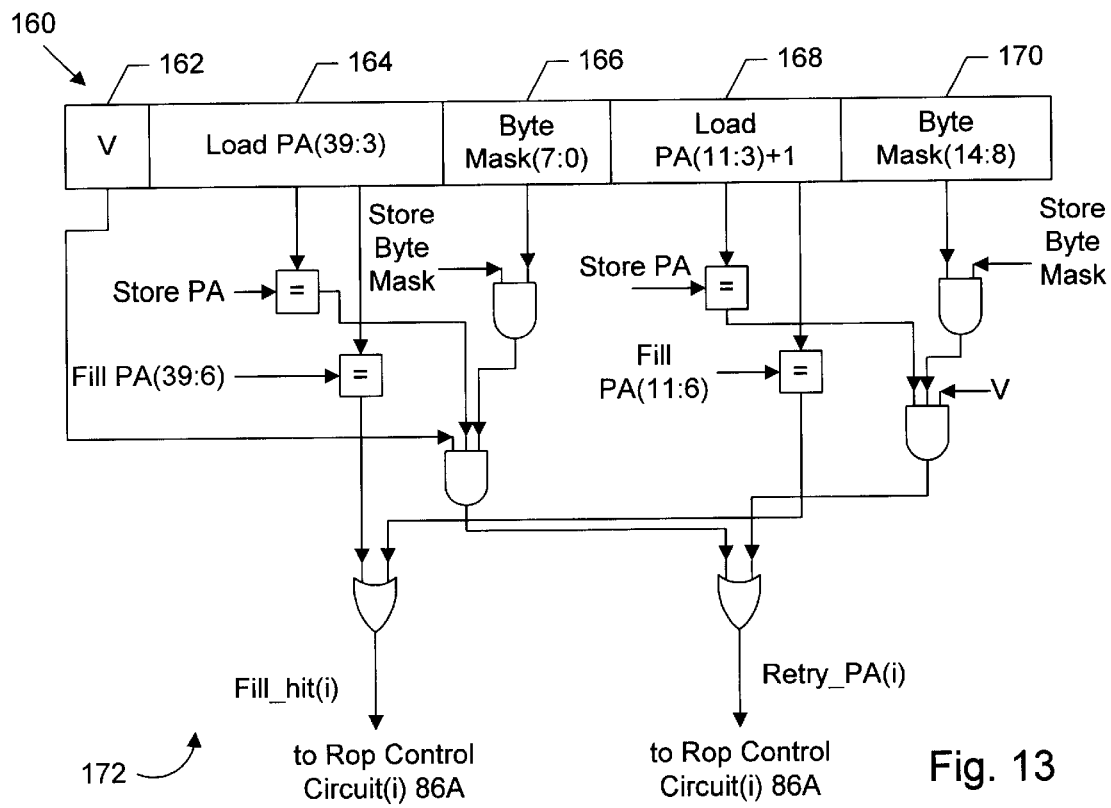
FIG. 13 is a diagram of an exemplary entry within one embodiment of the physical address buffer shown in FIG. 4, along with exemplary logic for operating upon the entry.

Turning next to FIG. 13, an exemplary physical address buffer entry 160 is shown which may be employed by one embodiment of physical address buffer 90. Additionally, exemplary combinatorial logic circuitry 172 is shown. Circuitry 172 may be used to generate the fill_hit(i) and retry_PA(i) signals. Other embodiments are possible and contemplated. More specifically, any suitable combinatorial logic circuitry may be used, including any Boolean equivalents of the logic shown in FIG. 13. Furthermore, the information stored in entry 160 may be varied in form and content, according to design choice. In the embodiment of FIG. 13, entry 160 includes a valid bit 162, a first load PA field 164, a first byte mask field 166, a second load PA field 168, and a second byte mask field 170.

Generally, if the instruction operation in the instruction buffer entry to which entry 160 is assigned is a load memory operation, entry 160 is updated with the physical address information of the memory operand accessed by the load memory operation (the "load memory operand") and the valid bit 162 is set. In the present embodiment, the information is represented by the physical address of the quadword including the first byte of the load memory operand (first load PA field 164) and a byte mask indicating which bytes within the quadword are part of the load memory operand (first byte mask field 166). The byte mask comprises a bit for each byte within the quadword. If the bit is set, the corresponding byte is part of the load memory operand. If the bit is clear, the corresponding byte is not part of the load memory operand.

Load memory operands may be arbitrarily aligned within memory. Accordingly, one or more bytes of the load memory operand may be within one quadword and one or more bytes of the load memory operand may be within the next sequential quadword. Thus, entry 160 provides second load PA field 168 and second byte mask field 170. Second load PA field 168 stores the physical address of the next sequential quadword to first load PA field 168. In the present embodiment, the in-page portion of the physical address is stored in second load PA field 168. Since load memory operations which cross a page boundary are non-speculative in the present embodiment, it is sufficient to store only the in-page portion of the next sequential quadword (since if a page is crossed, the load memory operation will be reissued non-speculatively and thus no older stores will be issued subsequent to the reissuance of the load memory operation). Other embodiments may store the entirety of the next sequential quadword, or any other suitable portion, as desired. Furthermore, while the present embodiment stores addresses on a quadword granularity, other embodiments may use any other suitable granularity (e.g. octword, double word, etc.). Second byte mask field 170, similar to first byte mask field 166, indicates which bytes within the next sequential quadword are part of the load memory operand.

Execution core 40A provides the store physical address and corresponding byte mask during execution of store memory operations. Circuitry 172 compares corresponding portions of the store physical address to the values stored in first load PA field 164 and second load PA field 168. Additionally, corresponding store byte masks are provided. The AND gates receiving store and load byte masks within circuitry 172 represent logic which determines if at least one bit in the load byte mask and at least one corresponding bit in the store byte mask are set, indicating that at least one byte of the load memory operand is updated by the store memory operation. For example, an AND gate for each bit, the outputs of which are ORed, could be used. If entry 160 is valid, the physical address portions match, and at least one byte within the corresponding quadword is part of the load memory operand and is updated by the store memory operation, then the retry_PA(i) signal may be generated. It is noted that the retry_PA(i) signal may also be masked if the store memory operation is not prior to the load memory operation in program order (not shown in FIG. 3).

It is noted that store memory operands may be arbitrarily aligned in memory as well. Accordingly, one or more bytes of the store memory operand may be within one quadword and one or more bytes of the store memory operand may be within the next sequential quadword. Therefore, the store PA+1 (similar to the load PA+1) may be compared to the stored load PAs to detect a store PA hitting the load PA. The following formula may represent the Retry_PA(i) signal (in which the MATCH(A(n:0), B(n:0)) function returns a binary 1 if at least one bit in A(n:0) is set and a corresponding bit in B(n:0) is set):

Retry_PA(i)=V & Load_PA(39:12)=Store_PA(39:12) &
((Load_PA(11:3)=Store_PA(11:3) & MATCH(Store_Byte_Mask(7:0), Load_Byte_Mask(7:0)))|||
(Load_PA(11:3)+1=Store PA(11:3) & MATCH(Store_Byte_Mask(6:0), Load_Byte_Mask(14:8)))|||
(Load_PA(11:3)=Store_PA(11:3)+1 & MATCH(Store_Byte_Mask(14:8), Load_Byte_Mask(6:0))) |||
(Load_PA(11:3)+1=Store_PA(11:3)+1 & MATCH(Store_Byte_Mask(14:8), Load_Byte_Mask(14:8))))

It is further noted that the last of the four terms (comparing Load_PA(11:3)+1 and Store_PA(11:3)+1) is redundant and may be eliminated in the present embodiment since, for a memory operand to have a valid byte in the next sequential quadword, the memory operand has at least one valid byte (byte 7, represented by mask bit 7) in the first quadword. Thus, a match in the fourth term is encountered only if a match in the first term (comparing Load_PA(11:3) and Store_PA(11:3)) is also encountered.

Additionally, entry 160 is compared to fill/probe addresses provided by external interface unit 46. In the illustrated embodiment, the address of the cache line being provided in a fill is provided to physical address buffer 90 for comparison. A corresponding portion of first load PA field 164 and second load PA field 168 may be compared to the fill address. If a match is detected, the fill_hit(i) signal may be asserted. In other embodiments, the cache line may be provided to D-cache 44 as a plurality of packets. The portion of the address identifying the cache line and packet being provided may be compared in such embodiments.

It is still further noted that the Retry_PA(i) signal may be masked if the store memory operation corresponding to the store_PA is younger than the load memory operation corresponding to the entry 160.

Figure 14:
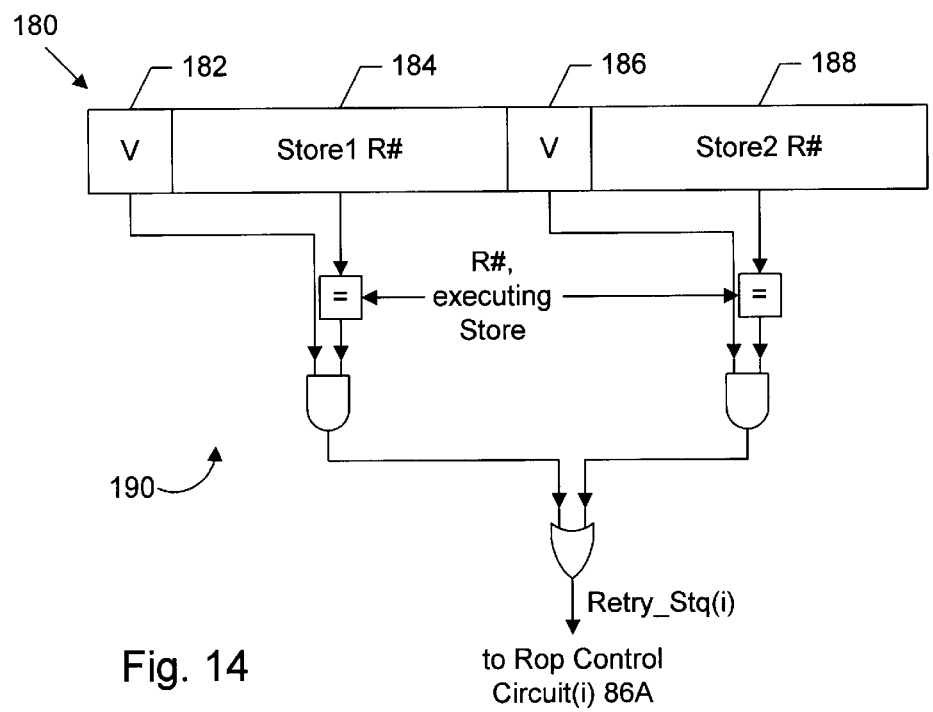
FIG. 14 is a diagram of an exemplary entry within one embodiment of the store identifier buffer shown in FIG. 4, along with exemplary logic for operating upon the entry.

Turning now to FIG. 14, an exemplary store R# buffer entry 180 is shown which may be employed by one embodiment of store R# buffer 92. Additionally, exemplary combinatorial logic circuitry 190 is shown. Circuitry 190 may be used to generate the retry_stq(i) signal. Other embodiments are possible and contemplated. More specifically, any suitable combinatorial logic circuitry may be used, including any Boolean equivalents of the logic shown in FIG. 14. Furthermore, the information stored in entry 180 may be varied in form and content, according to design choice. In the embodiment of FIG. 14, entry 180 includes a valid bits 182 and 186 and store R# fields 184 and 188.

Generally, if the instruction operation in the instruction buffer entry to which entry 180 is assigned is a load memory operation, entry 180 is updated with the store R# of a store in store queue 70 which is hit by the load memory operation. The present embodiment provides for forwarding from up to two store memory operations to a load memory operation, and thus two store R# fields 184 and 188 are provided to record the R# of each forwarding store. Respective valid bits 182 and 186 are set if corresponding forwarding stores are detected. Other embodiments may forward from only one store, and entry 180 may record only one store R#. Still other embodiments may forward from more than two stores, and entry 180 may record a corresponding number of Store R#s.

As store memory operations are executed, load/store unit 42 provides the R# of the store memory operation to store R# buffer 92. The R# is compared to the R#s stored in entry 180, and if a match is detected (and the corresponding valid bit is set), circuitry 190 asserts the retry_stq(i) signal. As mentioned above, in another alternative, store queue numbers may be stored in buffer 92 and store queue numbers may be provided for comparison.

Figure 15:
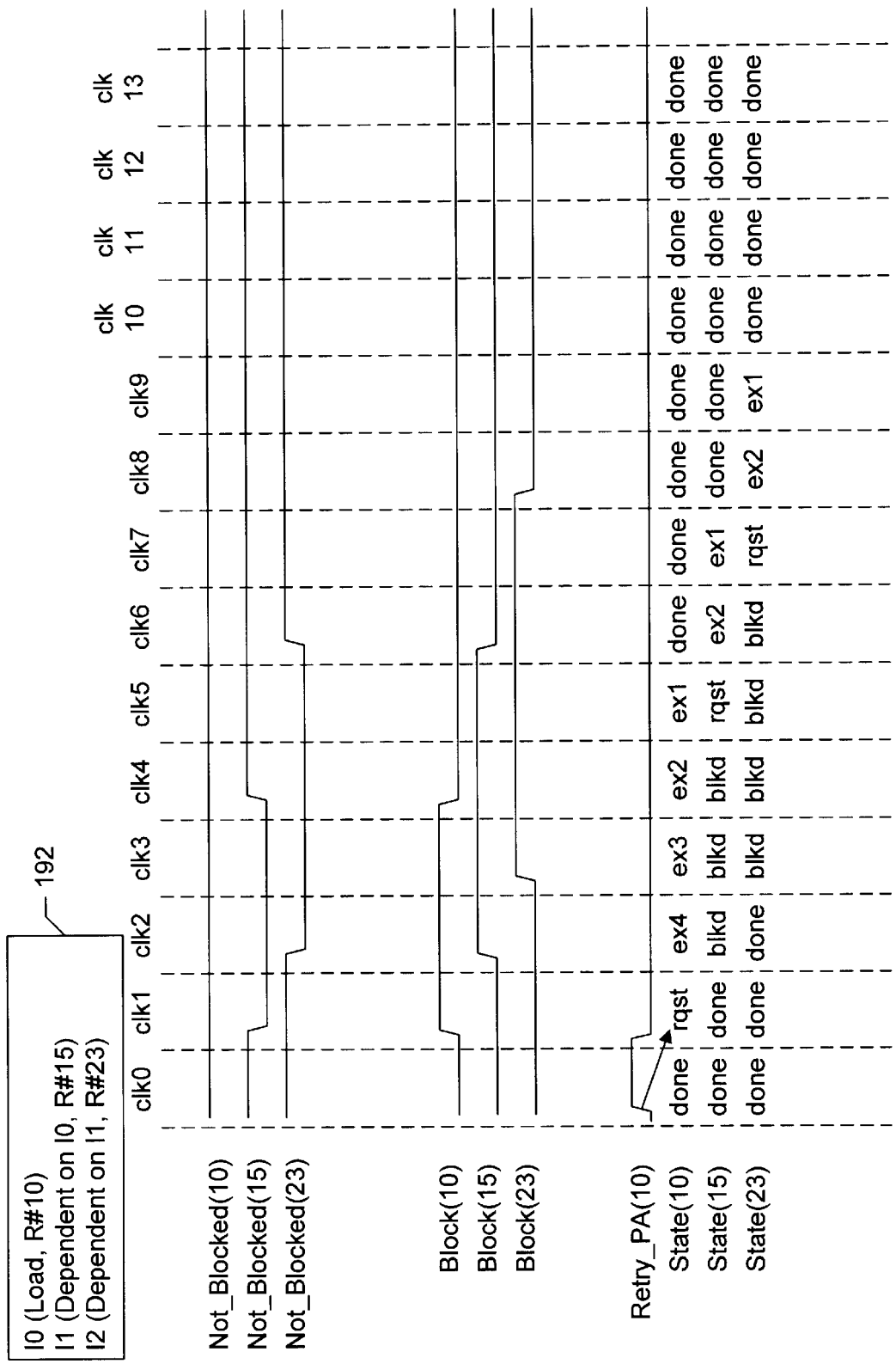
FIG. 15 is a timing diagram of one embodiment of retrying a load in response to a store address hitting the load address, and the subsequent undoing of dependent operations.

Turning next to FIG. 15, a timing diagram illustrating a retry of a load memory operation via a hit in physical address buffer 90 is illustrated. A retry of a load memory operation via a hit in store R# buffer 92 may be similar. Clock cycles are delimited by vertical dashed lines, with an identifier for each clock cycle at the top between the vertical dashed lines delimiting that clock cycle. A box 192 illustrates the exemplary dependency chain, which are the same instruction operations I0 through I2 and dependencies from the example of FIG. 11 (except that I0 is now a load memory operation). The Block and Not_Blocked signals for each instruction operation are illustrated, as well as the states of each instruction operation (as recorded by ROP control circuit 86), similar to the example of FIG. 11. The states illustrated in FIG. 12 are represented in a manner similar to FIG. 11. Additionally, the Exec4 and Exec3 states are illustrated as "ex4" and "ex3", respectively. Again similar to FIG. 11, certain events which cause other events are illustrated by arrows from the event to the resulting event. In this example, load memory operation I0 is of latency 4.

At clock cycle clk0, each of the instruction operations I0–I2 have been issued and executed, and are thus in the done state. Corresponding Block signals are deasserted and Not_Blocked signals are asserted. However, a hit on physical address buffer 90 is detected for R#10 (retry_PA(10) is asserted during clock cycle clk0). In response, State(10) transitions to the request state in clock cycle clk1. Additionally, the Block(10) signal is asserted, and I1 and I2 are subsequently undone during clock cycles clk2 through clk3.

The load memory operation I0 is selected for execution and passes through the executing states to the done state in clock cycles clk2 through clk6. In response to I0 reaching the Exec2 state in clock cycle clk4, the Block(10) signal is deasserted (and hence the Not_Blocked(15) signal becomes asserted. Instruction operations I1 and I2 thus are rescheduled and reissued as shown in FIG. 15.

FIG. 15 illustrates that a load instruction operation may be issued and executed prior to store memory operations upon which the load instruction operation depends. Subsequently, the store memory operations may be issued and the dependency detected. The dependency is respected by reissuing the load memory operation (and its dependency chains) from scheduler 36 upon detection of the dependency. A similar timing diagram with the retry_stq(10) signal asserted illustrates the detection of a false dependency of a load memory operation on a prior store memory operation which is incorrectly executed and subsequently reissued. Again, scheduler 36 handles the situation by reissuing the load memory operation and its dependency chains. Correct operation may be provided with minimal performance degradation, and thus aggressive speculative execution may be performed and higher performance may be realized.

Computer Systems

Figure 16:
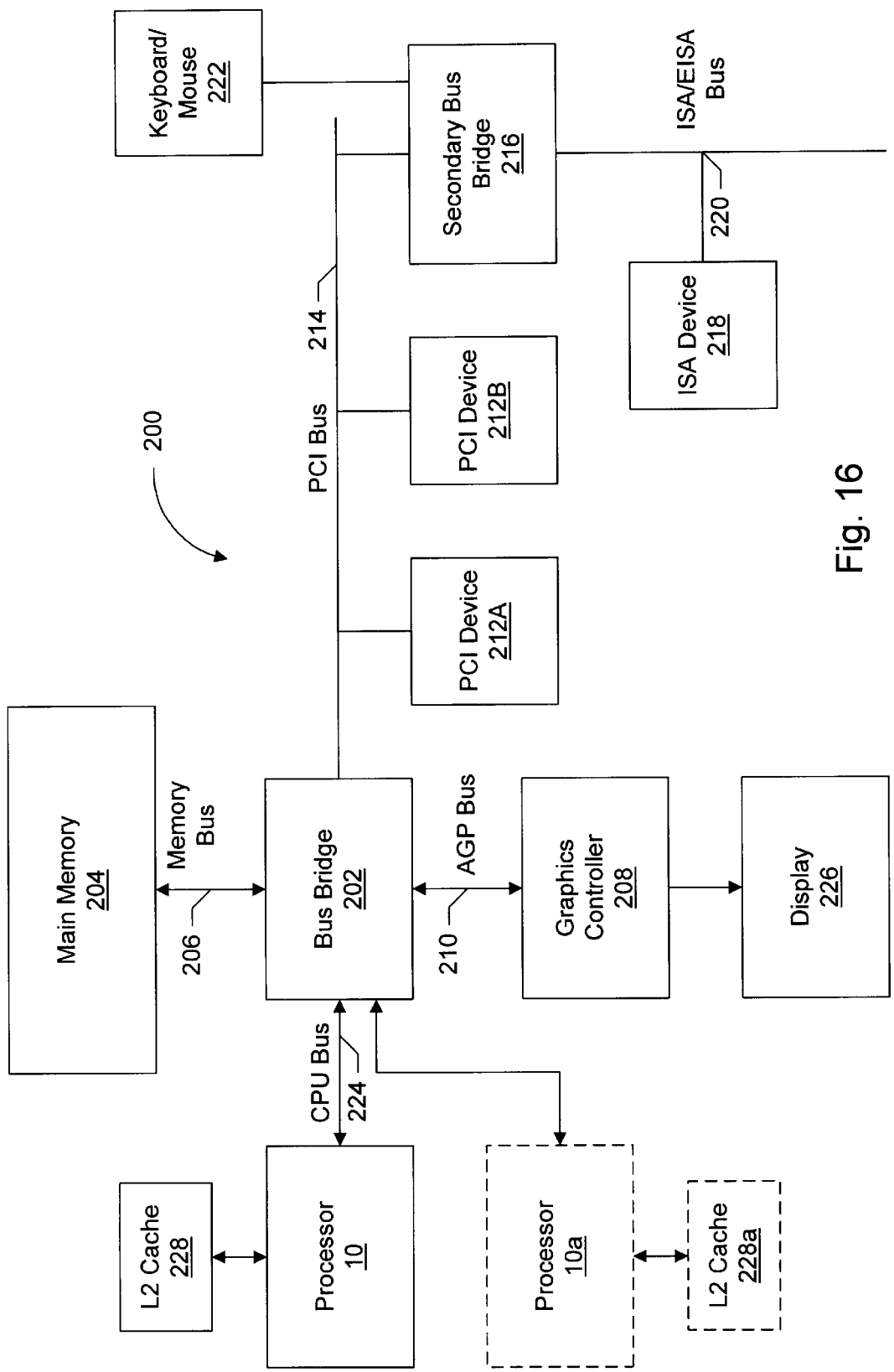
FIG. 16 is a block diagram of a first embodiment of a computer system including the processor shown in FIG. 1.

Turning now to FIG. 16, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise external interface 52.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 16) or may share CPU bus 224 with processor 10. Furthermore, processor 10a may be coupled to an optional L2 cache 228a similar to L2 cache 228.

Figure 17:
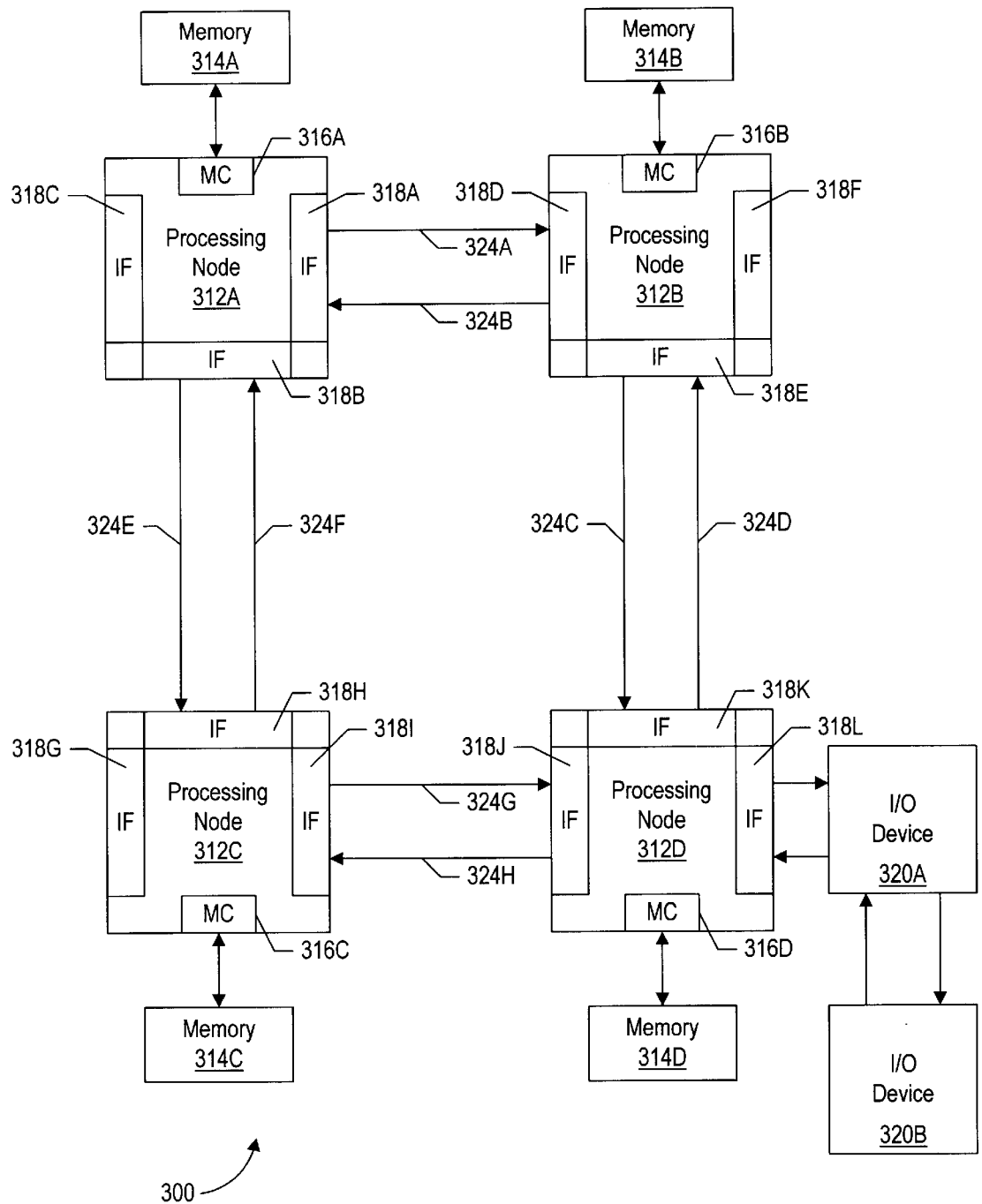
FIG. 17 is a block diagram of a second embodiment of a computer system including the processor shown in FIG. 1.

Turning now to FIG. 17, another embodiment of a computer system 300 is shown. Other embodiments are possible and contemplated. In the embodiment of FIG. 17, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are transmit packets from processing node 312A to processing node 312B and lines 324B are used to transmit packets from processing node 312B to processing node 312A). Other sets of lines 324C–324H are used to transmit packets between other processing nodes as illustrated in FIG. 17. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 17. Any suitable routing algorithm may be used. Other embodiments of computer system 300 may include more or fewer processing nodes then the embodiment shown in FIG. 17.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, a processing node 312A–312D may comprise processor 10. External interface unit 46 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A scheduler comprising:

an instruction buffer configured to store a first instruction operation;

an issue pick circuit coupled to said instruction buffer, wherein said issue pick circuit is configured to select said first instruction operation for issue from said instruction buffer, and wherein said first instruction operation is speculative; and a control circuit coupled to said issue pick circuit and coupled to receive a first signal, during execution of said first instruction operation, indicating that said first instruction operation is to execute non-speculatively, wherein said control circuit is configured to maintain a first execution state of said first instruction operation, and wherein said control circuit is configured to change said first execution state to an executing state responsive to said issue pick circuit selecting said first instruction operation for issue, and wherein said control circuit is configured to change said first execution state to a not executed state responsive to said first signal, and wherein said control circuit is configured to record a first indication that said first instruction operation is to be executed non-speculatively in response to said first signal.

2. The scheduler as recited in claim 1 wherein said not executed state comprises a block state in which said first instruction operation is inhibited from being selected by said issue pick circuit.

3. The scheduler as recited in claim 2 wherein said control circuit is configured to determine that said first instruction operation is non-speculative.

4. The scheduler as recited in claim 3 wherein, responsive to determining that said first instruction operation is non-speculative, said control circuit is configured to change said first execution state to a request state, and wherein said control circuit is configured to signal said issue pick circuit that said first instruction operation is issuable.

5. The scheduler as recited in claim 4 wherein said issue pick circuit is configured to select said first instruction operation for reissue responsive to said signal from said control circuit.

6. A processor comprising:

a scheduler configured to store a first instruction and to speculatively issue said first instruction operation, wherein said scheduler is configured to maintain a first execution state of said first instruction operation, and wherein said scheduler is configured to change said first execution state to an executing state responsive to issuing said first instruction operation;

an execution unit coupled to said scheduler to receive said first instruction operation in response to an issuance thereof, wherein said execution unit is configure to execute said first instruction operation and, during execution of said first instruction operation, said execution unit is configured to determine that said first instruction operation is to execute non-speculatively, and wherein said execution unit is configured, responsive to determining that said first instruction operation is to execute non-speculatively, to generate a first signal;

wherein said scheduler is configured to change said first execution state to a not executed responsive to said first signal and wherein said scheduler is configured to record a first indication that said first instruction operation is to be executed non-speculatively in response to said first signal.

7. The processor as recited in claim 6 wherein said scheduler is configured to determine that said first instruction operation is non-speculative and is further configured to reissue said first instruction operation non-speculatively.

8. The processor as recited in claim 7 wherein said scheduler is configured to inhibit reissuing said first instruction operation until said first instruction operation is non-speculative responsive to said first indication.

9. The processor as recited in claim 6 wherein said first instruction operation comprises a memory operation.

10. The processor as recited in claim 9 wherein said execution unit comprises a translation lookaside buffer (TLB), and wherein said execution unit is configured to generate said first signal if said TLB indicates that said memory operation accesses a non-speculative memory type.

11. The processor as recited in claim 9 wherein said execution unit comprises a translation lookaside buffer (TLB) and wherein, if an address of a datum accessed by said memory operation misses in said TLB, said execution unit is configured to generate said first signal.

12. The processor as recited in claim 9 wherein said execution unit comprises an address generation unit configured to generate an address of a datum accessed by said memory operation, and wherein said execution unit is configured to generate said first signal if said address and a number of bytes accessed by said memory operation leads to a page crossing of said address.

13. A computer system comprising:
a processor including:
a scheduler configured to store a first instruction operation and to speculatively issue said first instruction operation, wherein said scheduler is configured to maintain a first execution state of said first instruction operation, and wherein said scheduler is configured to change said first execution state to an executing state responsive to issuing said first instruction operation; and
an execution unit coupled to said scheduler to receive said first instruction operation in response to an issuance thereof, wherein said execution unit is configured to execute said first instruction operation and, during execution of said first instruction operation, said execution unit is configured to determine that said first instruction operation is to execute non-speculatively, and wherein said execution unit is configured, responsive to determining that said first instruction operation is to execute non-speculatively, to generate a first signal;
wherein said scheduler is configured to change said first execution state to a not executed state responsive to said first signal and wherein said scheduler is configured to record a first indication that said first instruction operation is to be executed non-speculatively in response to said first signal; and
an input/output (I/O) device configured to communicate between said computer system and another computer system to which said I/O device is couplable.

14. The computer system as recited in claim 13 wherein said I/O device comprises a modem.

15. A method comprising:
speculatively issuing a first instruction operation from a scheduler to an execution unit;
executing said first instruction operation in said execution unit, said executing including determining that said first instruction operation is to be executed non-speculatively;
determining that said first instruction operation is non-speculative; and
reissuing said first instruction operation responsive to said determining that said first instruction operation is non-speculative.

16. The method as recited in claim 15 wherein said first instruction operation comprises a memory operation, and wherein said determining that said first instruction operation is to be executed non-speculatively comprises translating an address of a datum accessed by said memory operation and determining that said address is a non-speculative memory type.

17. The method as recited in claim 15 wherein said first instruction operation comprises a memory operation, and wherein said determining that said first instruction operation is to be executed non-speculatively comprises detecting that an address of a datum accessed by said memory operation is a miss in a translation lookaside buffer.

18. The method as recited in claim 15 wherein said first instruction operation comprises a memory operation, and wherein said determining that said first instruction operation is to be executed non-speculatively comprises detecting that an address of a datum accessed by said memory operation is a page crossing.

19. A processor comprising:
a scheduler configured to store a first instruction operation and to speculatively issue said first instruction operation, wherein said scheduler is configured to retain said first instruction operation subsequent to issuing; and
an execution unit coupled to said scheduler to receive said first instruction operation in response to an issuance thereof, wherein said execution unit is configured to execute said first instruction operation and, during execution of said first instruction operation, said execution unit is configured to determine that said first instruction operation is to execute non-speculatively, and wherein said execution unit is configured, responsive to determining that said first instruction operation is to execute non-speculatively, to generate a first signal;
wherein said scheduler is coupled to receive said first signal from said execution unit and, responsive to said first signal and to said first instruction operation becoming non-speculative, said scheduler is configured to reissue said first instruction operation.

20. The processor as recited in claim 19 wherein said scheduler is configured to inhibit reissuing said first instruction operation until said first instruction operation is non-speculative responsive to said first indication.

21. The processor as recited in claim 19 wherein said first instruction operation comprises a memory operation.

22. The processor as recited in claim 21 wherein said execution unit comprises a translation lookaside buffer (TLB), and wherein said execution unit is configured to generate said first signal if said TLB indicates that said memory operation accesses a non-speculative memory type.

23. The processor as recited in claim 21 wherein said execution unit comprises a translation lookaside buffer (TLB) and wherein, if an address of a datum accessed by said memory operation misses in said TLB, said execution unit is configured to generate said first signal.

24. The processor as recited in claim 21 wherein said execution unit comprises an address generation unit configured to generate an address of a datum accessed by said memory operation, and wherein said execution unit is configured to generate said first signal if said address and a number of bytes accessed by said memory operation leads to a page crossing of said address.

* * * * *

UNITED STATES PATENT AND TRADEMARK OFFICE
CERTIFICATE OF CORRECTION

PATENT NO. : 6,564,315 B1  
DATED : May 13, 2003  
INVENTOR(S) : James B. Keller, Ramsey W. Haddad and Stephen G. Meier It is certified that error appears in the above-identified patent and that said Letters Patent is hereby corrected as shown below:

<u>Column 38,</u>  
Line 44, please insert -- operation -- between "instruction" and "and to".  
Line 50, please insert -- and -- after "operation;".  
Line 53, please delete "configure" and insert -- configured -- in place thereof.

Signed and Sealed this

Seventh Day of October, 2003

JAMES E. ROGAN  
*Director of the United States Patent and Trademark Office*